United States Patent

Kamiya et al.

[11] Patent Number: 6,135,920
[45] Date of Patent: Oct. 24, 2000

[54] APPARATUS AND METHOD FOR AUTOMATICALLY STARTING AND STOPPING A VEHICLE ENGINE TO EFFECT A SMOOTH CHANGE FROM A VEHICLE BRAKE RELEASE STATE TO A VEHICLE DRIVE STATE

[75] Inventors: Masaru Kamiya, Toyoake; Akira Kato, Anjo; Takahiro Souki, Toyota, all of Japan

[73] Assignee: Denso Corporation, Kariya, Japan

[21] Appl. No.: 09/335,739

[22] Filed: Jun. 18, 1999

[30] Foreign Application Priority Data

Jun. 19, 1998 [JP] Japan .................................. 10-173415

[51] Int. Cl.$^7$ ................................................ B60K 41/20
[52] U.S. Cl. ........................... 477/185; 477/203; 477/204
[58] Field of Search .................................. 477/185, 189, 477/201, 203, 204, 4, 21, 27

[56] References Cited

U.S. PATENT DOCUMENTS

| | | | |
|---|---|---|---|
| 1,727,384 | 9/1929 | Thomas | 477/204 |
| 2,793,706 | 5/1957 | Moreland | 477/204 |
| 4,192,279 | 3/1980 | Maisch et al. | 477/98 |
| 4,362,133 | 12/1982 | Malik | 477/99 |
| 4,454,789 | 6/1984 | Kaspar et al. | 477/83 |
| 5,343,970 | 9/1994 | Severinsky | 180/65.2 |
| 5,653,659 | 8/1997 | Kunibe et al. | 477/111 |

FOREIGN PATENT DOCUMENTS

| | | |
|---|---|---|
| 57-183538 | 11/1982 | Japan . |
| 58-38346 | 3/1983 | Japan . |
| 59-110346 | 7/1984 | Japan . |
| 9-209790 | 8/1997 | Japan . |

*Primary Examiner*—Sherry L. Estremsky
*Attorney, Agent, or Firm*—Pillsbury Madison & Sutro LLP

[57] ABSTRACT

An engine automatic speed control apparatus which exhibits a smooth transition from brake release to an engine drive state. An ECU determines braking force such that a vehicle does not move in correspondence with the slope of a road surface according to a road surface slope sensor while monitoring an operated quantity of a brake pedal according to a brake pedal operated-quantity sensor. The ECU stops an engine when braking force is applied via the brake pedal such that the vehicle does not move. After stopping the engine, the ECU determines braking force such that the vehicle does not move in correspondence with slope of the road surface according to the road surface slope sensor, and restarts the engine when braking force becomes less than braking force required to maintain the vehicle in a stopped state. The ECU then restarts the engine in the interval from relaxing of braking force via the brake pedal until the brake pedal is released.

19 Claims, 21 Drawing Sheets

APPARATUS AND METHOD FOR AUTOMATICALLY STARTING AND STOPPING A VEHICLE ENGINE TO EFFECT A SMOOTH CHANGE FROM A VEHICLE BRAKE RELEASE STATE TO A VEHICLE DRIVE STATE

CROSS-REFERENCE TO RELATED APPLICATION

The present application is related to, and claims priority from, Japanese Patent Application No. Hei. 10-173415, the contents of which are incorporated herein by reference.

BACKGROUND OF THE INVENTION

1. Field of Invention

The present invention relates generally to the control of motor vehicle engine speed during a braking period, and more particularly to automatic control of vehicle engine speed during a vehicle braking period in which the vehicle is stopped, and subsequently during the transition time from when the vehicle brake pedal is released to when the vehicle again begins to move.

2. Description of Related Art

A conventional engine automatic speed control apparatus economizes fuel and improves exhaust emissions when, for example, an automobile stops at an intersection during city-street driving, by automatically stopping, and thereafter restarting the engine under predetermined conditions. Accordingly, the engine automatic speed control apparatus described in Japanese Patent Application Laid-open No. Hei 9-209790 restarts an engine from a stopped state by causing release of a brake condition prior to operation of the accelerator pedal.

However, in some cases, sufficient engine output is not obtained when the accelerator pedal is operated after the brake is released. Thus, it would be desirable to increase engine speed to a sufficient output level before the accelerator pedal is depressed. In particular, in a vehicle having an automatic transmission with a torque converter, it may be difficult to perform travel known as creeping, wherein the vehicle moves slowly when the shift lever is in the "Drive" position even when the accelerator pedal is not depressed.

SUMMARY OF THE INVENTION

In this regard, it is an object of the present invention to provide an engine automatic speed control apparatus for a vehicle which can smoothly change from a brake release state to an engine drive state.

A vehicle engine automatic speed control apparatus according to the present invention comprises a control unit for restarting an engine after engine stoppage accompanying operation of a braking force operating member. The control unit is for restarting the engine in an interval from after braking force is alleviated by the braking force operating member until the braking force operating member is released.

As a result, the engine is started quickly, and sufficient engine output is obtained when the accelerator is operated after releasing the brake. In particular, in a vehicle provided with an automatic transmission with a torque converter, travel via creeping after brake release is possible.

DETAILED DESCRIPTION OF THE INVENTION

First Embodiment

Figure 1:
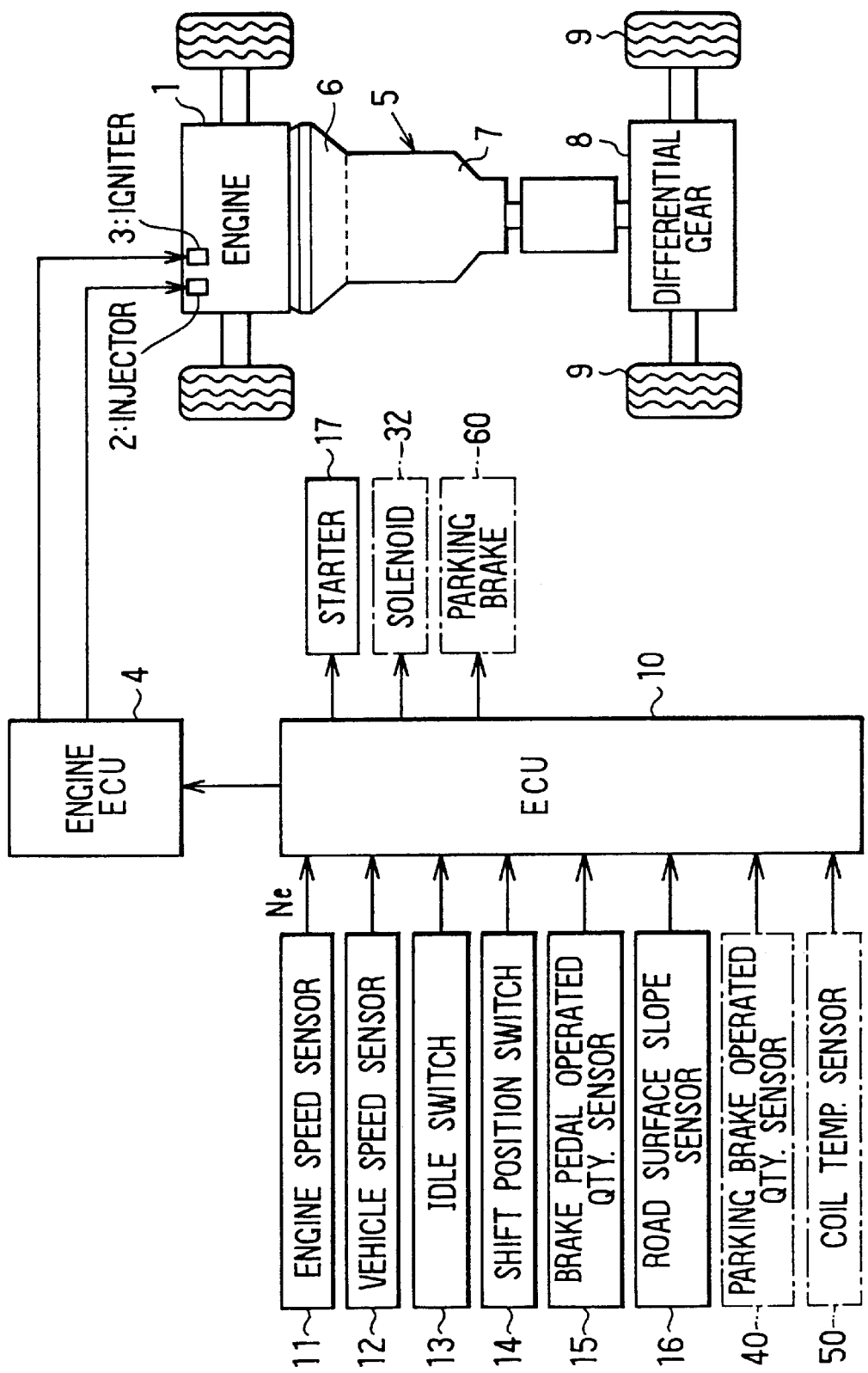
FIG. 1 is an overall structural view of an engine automatic speed control apparatus according to a first embodiment of the present invention.

Embodiments of the present invention will be described hereinafter with reference to the drawings.

The schematic structure of an engine in which the engine automatic speed control apparatus of the present invention is applied, and peripheral equipment thereof, will be described with reference to FIG. 1. Specifically, an engine 1, which is preferably a four-cycle gasoline engine is provided with injectors 2 and an igniter 3. An electronic control unit (ECU) for engine-controlling use 4 calculates the fuel-injection quantity from signals such as intake-air quantity, engine speed, and engine coolant-water temperature to optimize the air-fuel ratio of the engine 1, and causes an optimal fuel quantity to be injected from the injectors 2 disposed in the intake lines of the several cylinders. The ECU 4 controls the igniter 3 so that optimal ignition timing is obtained from the signals indicating the engine speed and the load state.

Meanwhile, an automatic transmission 5 is linked to the output shaft of the engine 1. This automatic transmission 5 is made up of a torque converter 6 to transmit the output of the engine 1, a gearbox 7 driven by the torque converter 6, and a hydraulic circuit (not illustrated) to switch the gear ratio of the gearbox 7 in correspondence with vehicle-body speed and the output of the engine 1. The operating mode of the automatic transmission 5 is switched via operation of a shift lever (not illustrated) disposed at the driver's seat among the several ranges of "Park" (P), "Reverse" (R), "Neutral" (N), "Drive" (D), "3rd Speed," "2nd Speed," and "1st Speed." Accordingly, the hydraulic circuit in the automatic transmission 5 is switched to obtain the optimal gear for the selected operating state. The output of the automatic transmission 5 is transmitted to a differential gear 8, and a drive wheel 9 is rotatably driven.

Additionally, an electronic control unit (ECU) 10 for automatically starting and stopping the engine (i.e., for decreasing engine speed while the vehicle is in a braked stationary state, and for increasing vehicle engine speed again subsequent to termination of the braked state) is mounted on the vehicle. The ECU 10 is primarily made up of a microprocessor, and is provided with an input circuit and an output circuit.

Figure 2:
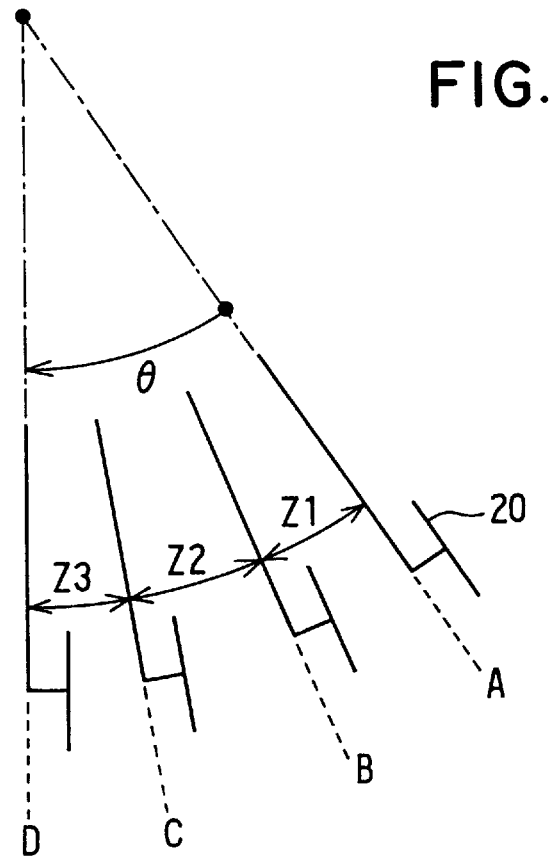
FIG. 2 is an explanatory drawing indicating an operating range of an accelerator pedal.

An engine-speed sensor 11, vehicle-speed sensor 12, idle switch 12, and shift-position switch 14 are connected to the ECU 10. The ECU 10 can detect engine speed, vehicle speed, whether the accelerator pedal has been released, and the position of the shift lever of the automatic transmission 5 according to signals from the sensors. Further, a brake pedal operated-quantity sensor 15 is connected to the ECU 10. As shown in FIG. 2, this brake pedal operated-quantity sensor 15 converts a brake pedal operated quantity to an electrical signal. In FIG. 2, position A represents the pedal position when there is no pedal depression, and position D represents the maximum depression position of the brake pedal 20.

Figure 3:
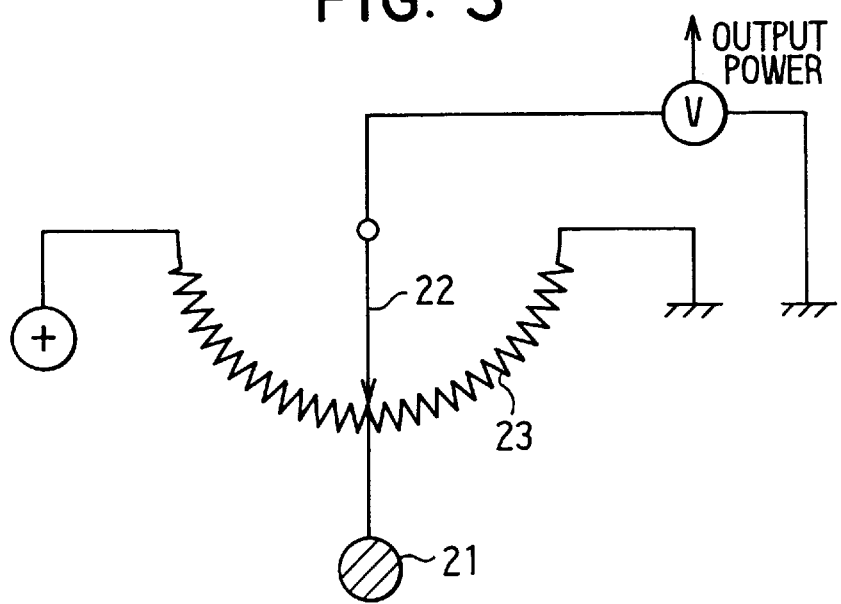
FIG. 3 is an explanatory drawing of a road surface slope sensor.

In FIG. 1, a road surface slope sensor 16 is connected to the ECU 10. This road surface slope sensor 16 detects the angle of slope of the road surface. As shown in FIG. 3, a sensor may be utilized in which a movable contact point 22 is connected with a depending weight 21. The movable contact point 22 is slidable on a circular resistor 23, a predetermined voltage is applied at the two ends of the resistor 23, and the potential at the area of contact with the movable contact point 22 is measured and output.

As shown in FIG. 1, the ECU 10 can send a fuel-cutoff signal and an ignition-cutoff signal to the ECU 4 that stops the engine 1. Additionally, the ECU 10 can send a fuel-injection signal and an ignition signal to the ECU 4, to perform fuel-injection operation and ignition operation of the engine 1. Further, a starter (motor) 17 is connected to the ECU 10, and the ECU 10 performs drive control for the starter 17.

A mode of operation of an engine automatic speed control apparatus for a vehicle of such structure will be described next.

Figure 4:
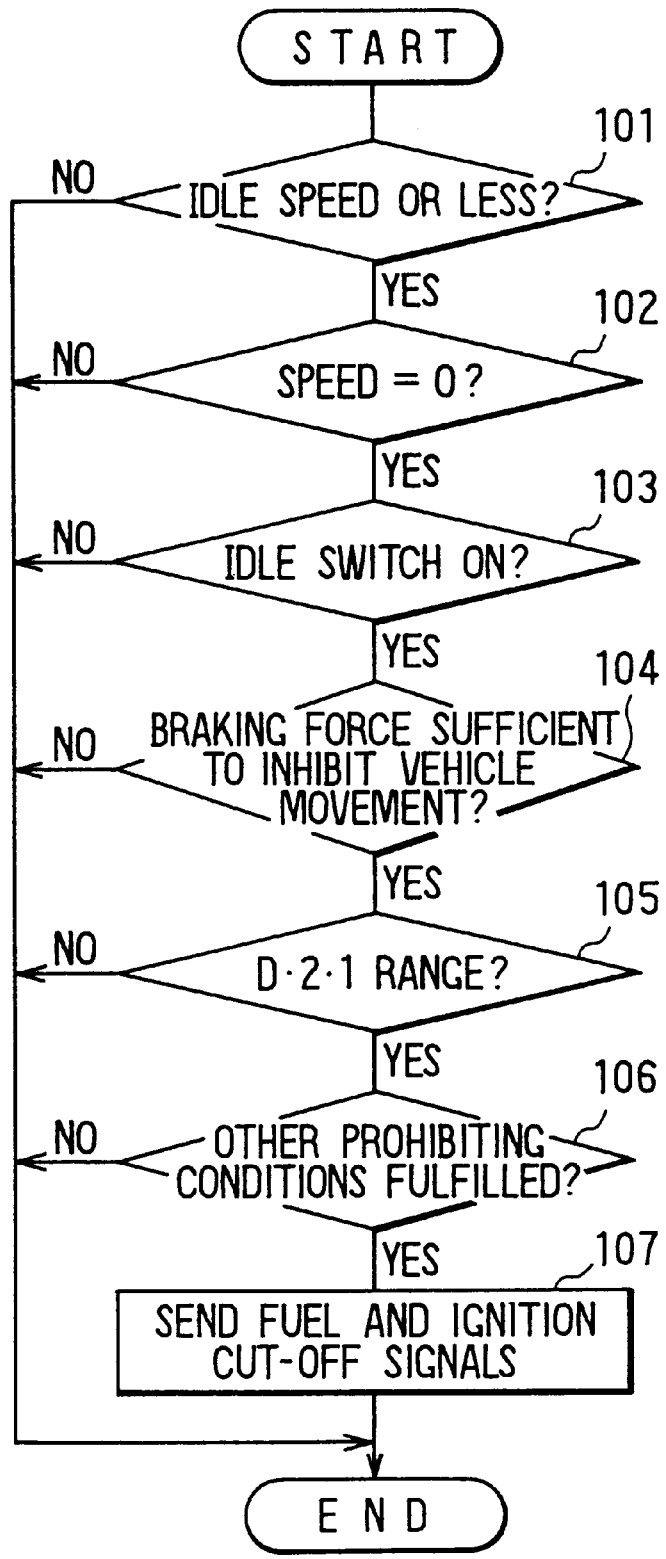
FIG. 4 is a flow diagram for describing a mode of operation of the first embodiment.
Figure 5:
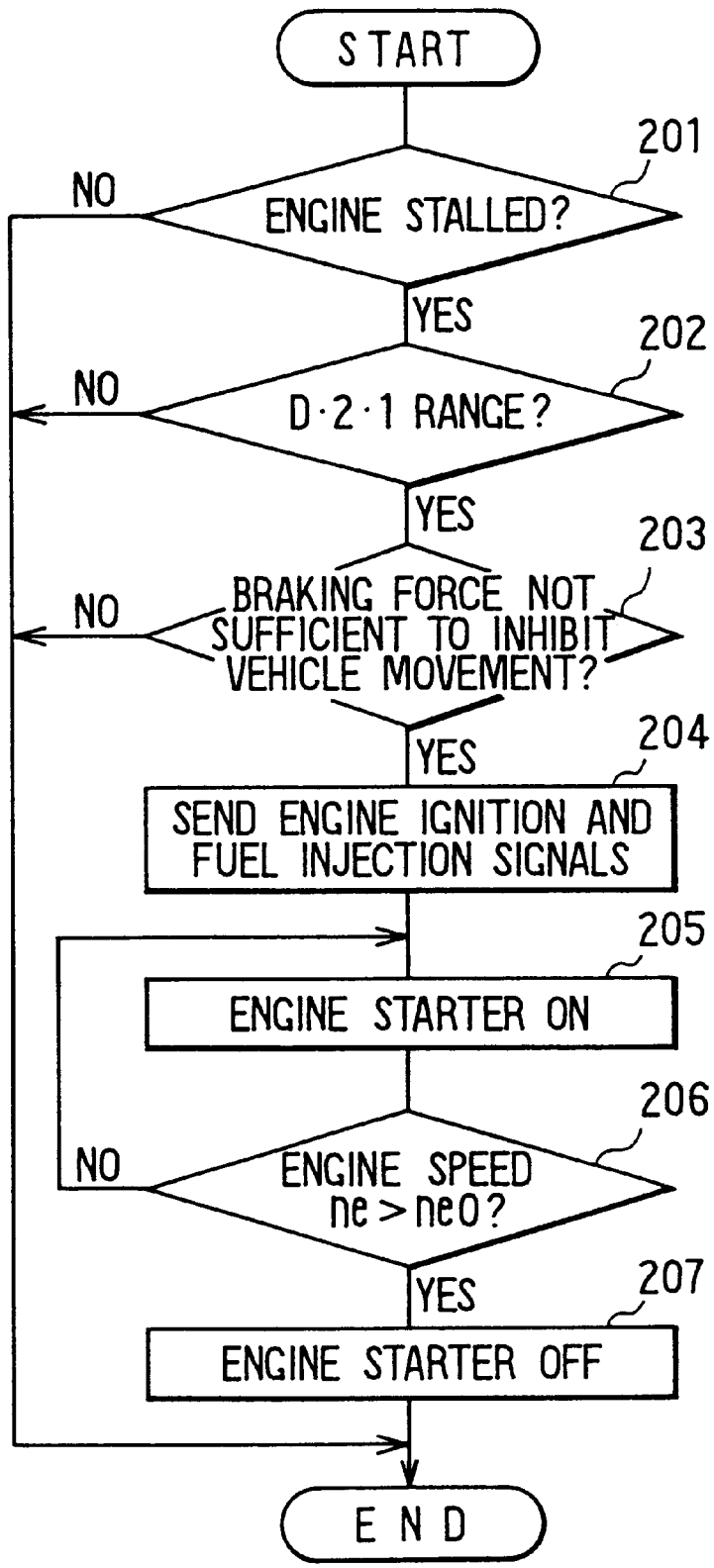
FIG. 5 is a flow diagram for describing a mode of operation of the first embodiment.
Figure 6:
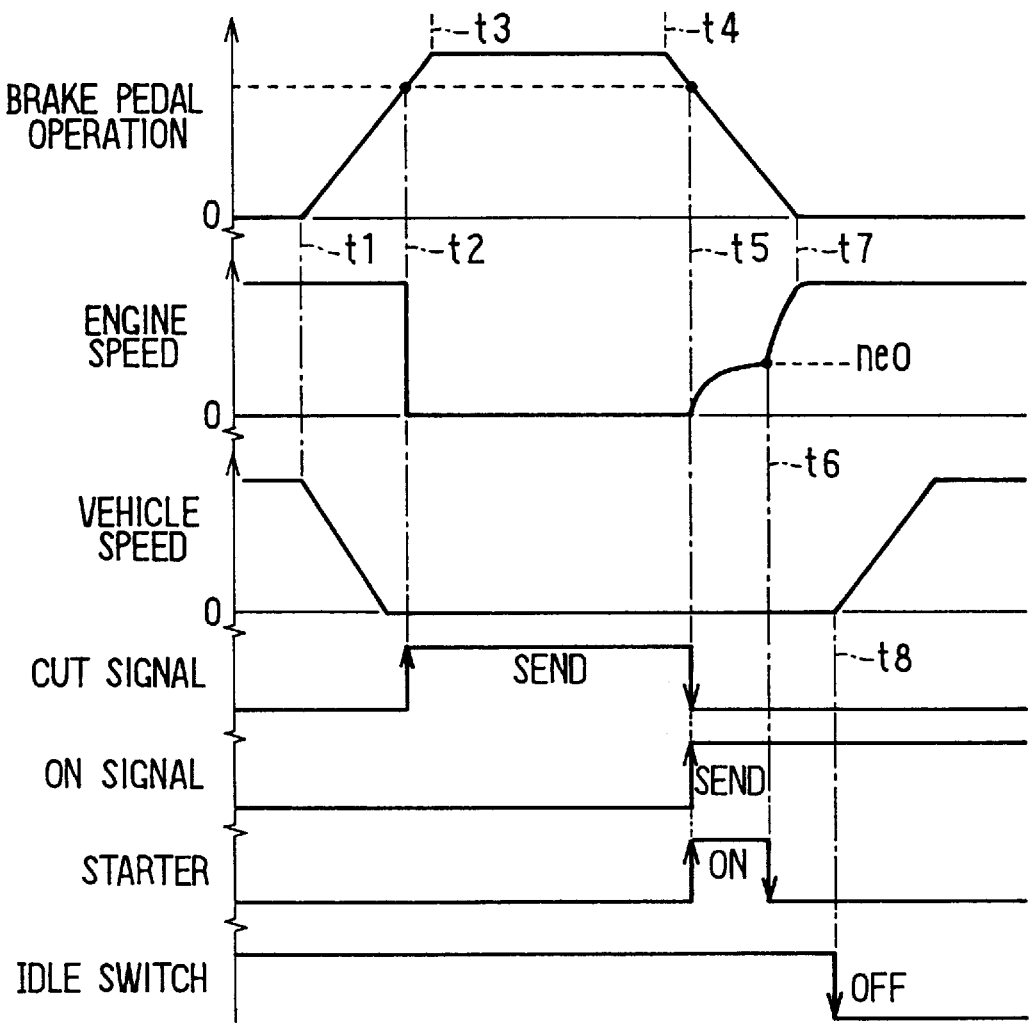
FIG. 6 is a timing diagram for describing a mode of operation of the first embodiment.

FIGS. 4 and 5 are processing flow diagrams for automatic engine stopping and starting, while FIG. 6 is a timing diagram. FIG. 6 shows the state of the brake pedal operated quantity, the engine speed, the vehicle speed, the engine-cutoff signals (fuel-cutoff signal and ignition-cutoff signal), the engine "on" signals (engine-ignition signal and fuel-injection signal), the starter, and the idle switch. In FIG. 6, depression of the brake pedal 20 starts at time t1 and continues until maximum depression at t3, which stops the vehicle. Thereafter, brake depression begins to be relaxed at time t4, and startoff is enabled when the vehicle operator releases his or her foot from the brake pedal 20 at t7. At time t8, depression of the accelerator pedal starts, causing the vehicle to travel.

The ECU 10 determines whether an engine-stopping condition has been fulfilled at steps 101–106 of FIG. 4. Specifically, at step 101, the ECU 10 determines whether engine speed is at or below idle speed, and at step 102 the ECU 10 determines whether vehicle speed is "0." At step 103, the ECU 10 determines whether the idle switch has been switched on without operation of the accelerator pedal.

Figure 7:
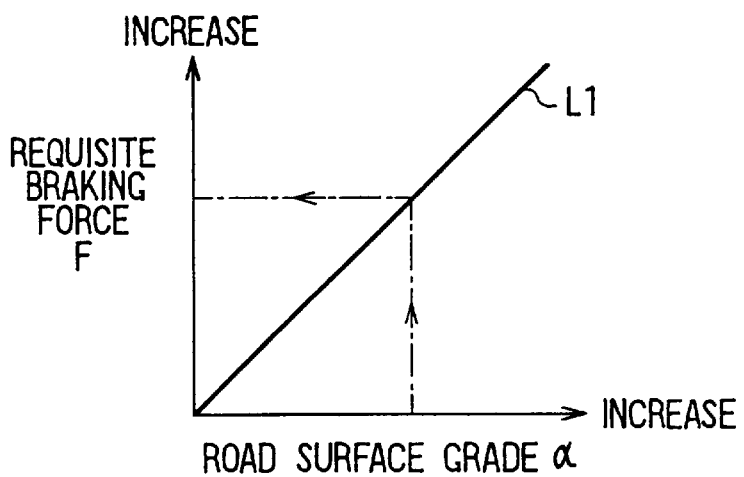
FIG. 7 is a map for determining required braking force.

At step 104, the ECU 10 determines whether braking force due to operation of the brake pedal 20 is greater than braking force to inhibit vehicle movement in correspondence with road surface slope angle. More specifically, the ECU 10 calculates required braking force (i.e., amount of pedal depression) F corresponding to the road surface slope angle according to the road surface slope sensor 16 using a map shown in FIG. 7, adds a predetermined margin quantity to this calculated value, and determines whether depression of the brake pedal greater than this amount of depression has been performed. Characteristic curve L1 of the map shown in FIG. 7 depicts previously determined braking force to inhibit vehicle movement corresponding to the road surface slope angle. In other words, when the brake pedal 20 is depressed from position A in FIG. 2, position B which can prevent rolling of the vehicle is reached, and rolling of the vehicle can reliably be prevented when the amount of pedal depression exceeds position C.

In this way, when the brake pedal 20 is further depressed to exceed position C (i.e., when the brake pedal is in region Z3 in FIG. 2), the determination at step 104 of FIG. 4 is "YES." Stated another way, the depression position (position B in FIG. 2), which can prevent rolling of the vehicle, changes in correspondence with the slope angle of the road surface. However, the ECU 10 calculates the amount of depression to prevent rolling of the vehicle from the slope of the road surface detected by the road surface slope sensor 16.

At step 105 in FIG. 4, the ECU 10 determines whether the shift lever is at "Drive" (D), "2nd Speed," or "1st Speed." At step 106, the ECU 10 determines whether other prohibiting conditions (engine coolant-water temperature being in a predetermined temperature range, no abnormality in charging system and battery state being favorable) are fulfilled.

Accordingly, when these conditions are obtained and the engine-stopping condition is fulfilled (time t2 in FIG. 6), the ECU 10 transfers execution to step 107 in FIG. 4 and sends the fuel-cutoff signal and the ignition-cutoff signal to the ECU for engine-controlling use 4, causing the engine to stop automatically.

Accordingly, after the processing for stopping the engine 1 is completed, the ECU 10 transfers to the engine starting processing in FIG. 5.

In FIG. 5, the ECU 10 determines whether an engine starting condition has been fulfilled at steps 201–203. Specifically, at step 201 the ECU 10 determines whether engine speed is less than a predetermined value, and the engine is stalled. At step 202, the ECU 10 determines whether the shift lever is at "Drive" (D), "2nd Speed," or "1st Speed." At step 203, the ECU 10 determines whether the brake pedal 20 has been relaxed and braking force is less than or equal to braking force to inhibit vehicle movement in correspondence with the road surface slope angle. More specifically, the ECU 10 calculates the required braking force (i.e., amount of pedal depression) F corresponding to the road surface slope angle from the road surface slope angle according to the road surface slope sensor 16 using the map shown in FIG. 7, adds a predetermined margin quantity to this calculated value, and determines whether depression of the brake pedal less than or equal to this amount of depression has been performed. That is to say, the ECU 10 determines whether depression of the brake pedal 20 has been relaxed beyond position C in FIG. 2 employed in determination of engine stoppage and has entered pedal-operation region Z2.

Accordingly, when these conditions all obtain and the starting condition for the engine 1 is fulfilled (time t5 in FIG. 6), the ECU 10 transfers execution to step 204 in FIG. 5 and sends the "on" signals (the engine 1 ignition signal and fuel-injection signal) to the ECU for engine-controlling use 4 to restart the engine, causing fuel injection and ignition to start. Additionally, in step 205 the ECU 10 actuates the starter 17 and starts the engine 1.

Thereafter, when engine speed ne exceeds engine combustion speed ne0 at step 206 (time t6 in FIG. 6), the engine is considered to have experienced complete combustion, and at step 207 the ECU 10 halts actuation of the starter 17, thereby stopping the starter 17.

As a result, after engine stoppage, the engine 1 is restarted in the interval during which the brake pedal 20 is in the region Z2 in FIG. 2, that is, in the interval after alleviation of braking force due to the brake pedal 20 until the brake pedal 20 is released. Therefore, a smooth startoff with minimal time lag associated with engine starting becomes possible. Additionally, inching utilizing the creeping force associated with an automatic-transmission vehicle becomes possible. Further, when starting off on a grade, startoff can be accomplished with no associated slip-back.

More particularly, when engine automatic-stopping conditions such as vehicle speed at "0," accelerator off, favorable battery state, and so on are fulfilled and the vehicle braking force is at or above a predetermined value, that is to say, when the engine is automatically stopped when sufficient braking force that prevents vehicle rolling can be ensured and the braking force is less than or equal to a predetermined value in an engine-stopped state, the engine is automatically restarted when braking force is weak while sufficient braking force to prevent vehicle rolling is ensured. Consequently, startoff can be accomplished with no slip-back not only on a level road, but on a grade as well.

Therefore, in the present embodiment, the ECU 10 restarts the engine 1 in an interval after alleviation of braking force via the brake pedal 20 until the brake pedal 20 is released, and so the engine is started quickly, and sufficient engine output is obtained when the accelerator is actuated after releasing the brake. In particular, in a vehicle provided with an automatic transmission with a torque converter 5, travel via creeping can be performed, wherein the vehicle moves slowly when the shift lever is in a position for travel even when the accelerator pedal 20 is not depressed.

Also in this embodiment, because sufficient braking force such that the vehicle does not move is determined in correspondence with the slope of the road surface utilizing the road surface slope sensor 16 as the road surface slope-detecting unit, the larger the slope, the greater the necessary setting for the braking force, and so slip-back of the vehicle can reliably be prevented.

In addition, in the present embodiment, the brake pedal operated-quantity sensor 15 is utilized as the operated-quantity detecting unit, and so a braking state can be detected via a simple structure.

Figure 8:
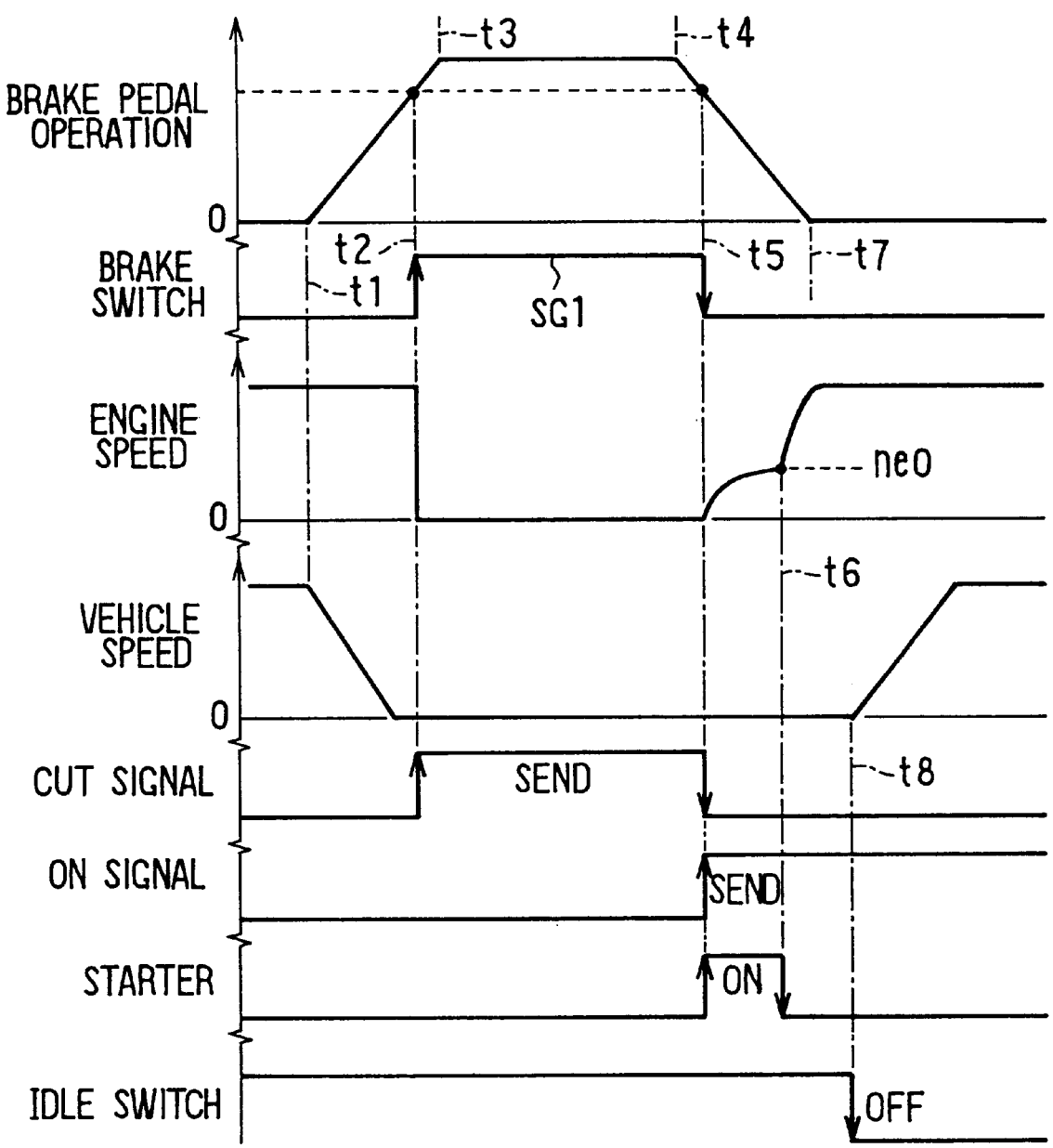
FIG. 8 is a timing diagram for describing another example of the first embodiment.

As a sample application of the present embodiment, a linear brake pedal operated-quantity sensor 15 may be utilized to continuously measure the position (operated quantity) of the brake pedal 20. However, as shown by signal waveform SG1 in FIG. 8, a switch which is switched on or off at a predetermined depressed position of the brake pedal 20 may alternatively be used. By providing a switch which outputs a switching signal at a predetermined depressed position of the brake pedal 20 and adopting a structure to detect braking force therewith, overall system structure is simplified and cost is reduced.

Additionally, brake pressure may be measured directly instead of detecting the operated quantity of the brake pedal 20. That is, a hydraulic-pressure sensor to detect brake pressure may be utilized in substitution for the brake pedal operated-quantity sensor 15. In this way, the braking state can accurately be detected by detecting brake pressure and taking this detected brake pressure to be the vehicle braking force.

Figure 9:
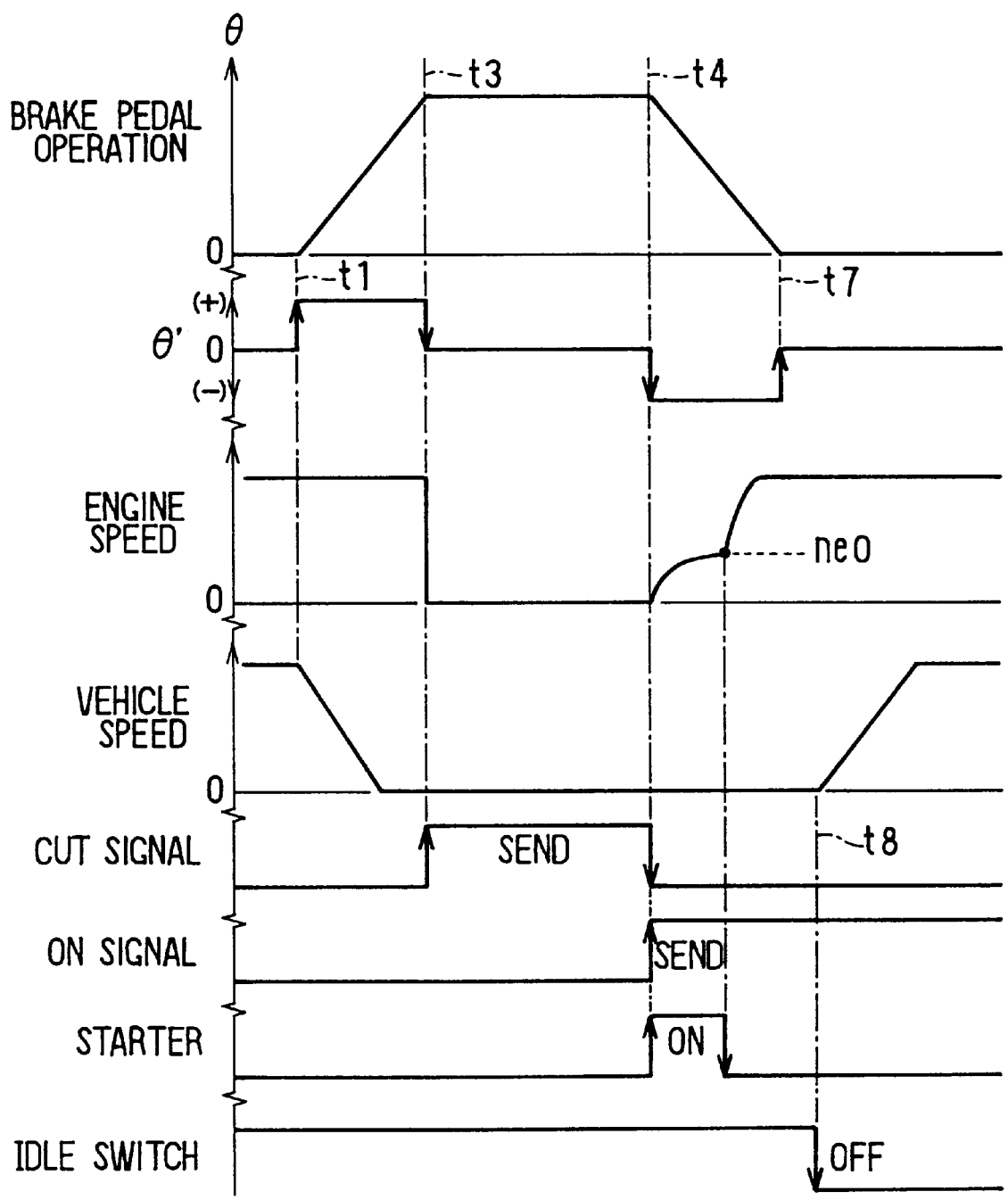
FIG. 9 is a timing diagram for describing another example of the first embodiment.

It is also acceptable to utilize a linear brake pedal operated-quantity sensor 15 to continuously measure the position of the brake pedal 20, and as shown in FIG. 9, determine whether the operated speed of the brake pedal 20 is positive or negative in order to detect the direction of pedal operation, and, when the operated speed of the brake pedal 20 is negative (time t4 in FIG. 9), restart the engine. As a result, the braking state can be detected via a simple structure, and the intent of the driver can be accurately detected by detecting the operated speed of the brake pedal 20.

Additionally, although a structure utilizing a foot brake braking force has been described, a structure utilizing braking force of, for example, a parking brake may alternatively be utilized.

Second Embodiment

A second embodiment will be described hereinafter, primarily with respect to how it differs from the first embodiment.

Figure 10:
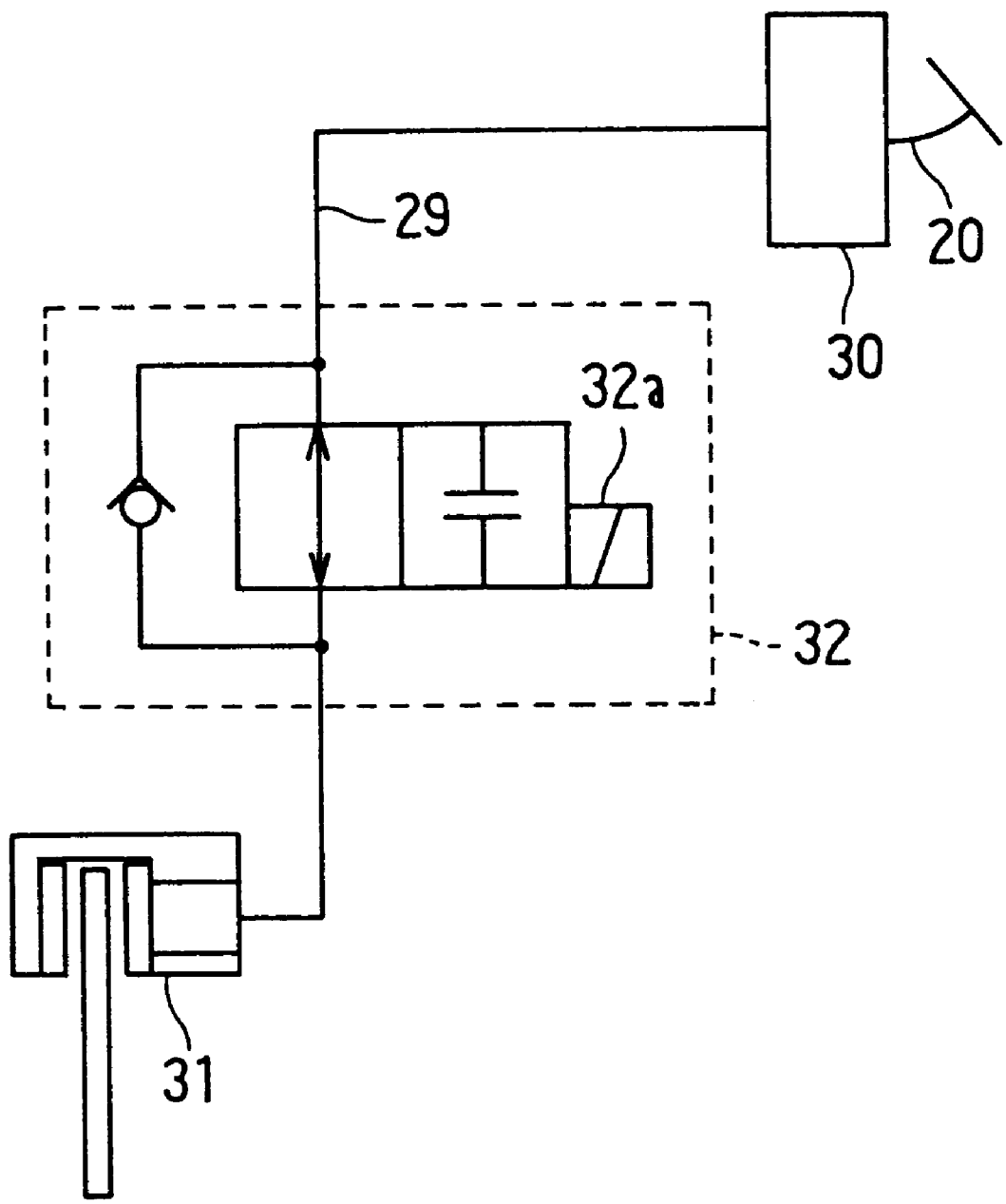
FIG. 10 is a diagram of a brake hydraulic circuit according to a second embodiment of the present invention.

As shown in FIG. 10, a brake pedal 20 interlocks with a master cylinder 30. The master cylinder 30 and a wheel cylinder 31 are interconnected with a hydraulic conduit 29, hydraulic pressure generated by the master cylinder 30 is transmitted to the wheel cylinder 31, and the vehicle wheel is braked. Herein, with this embodiment, a solenoid 32 is disposed in the hydraulic conduit 29 (i.e., in the hydraulic circuit) between the brake pedal 20 and the master cylinder 30. This solenoid 32 is a normally-open valve and closes the hydraulic circuit when actuated by a coil 32a, maintaining the brake hydraulic pressure at the wheel cylinder 31. Accordingly, brake pressure is maintained even when the brake pedal 20 is released by actuating (exciting) the coil 32a of the solenoid 32 when the brake pedal 20 is depressed. This control of the solenoid 32 is executed by the ECU 10 as shown in FIG. 1.

Figure 11:
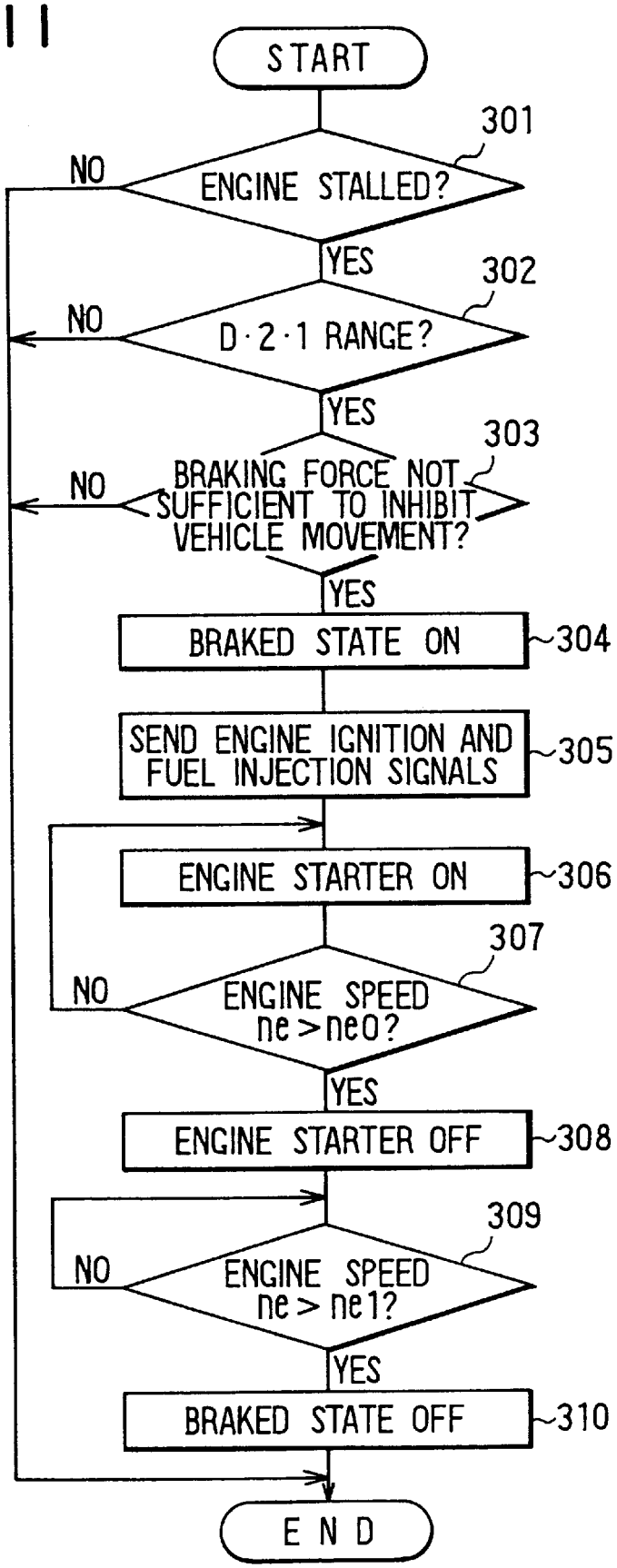
FIG. 11 is a flow diagram for describing a mode of operation of the second embodiment.

A mode of operation of an engine automatic speed control apparatus for a vehicle of such structure will be described next. After stopping of the engine via processing similar to that shown in FIG. 4, processing for starting the engine is started. FIG. 11 is a flow diagram for engine automatic restarting, and FIG. 12 is an associated timing diagram.

Figure 12:
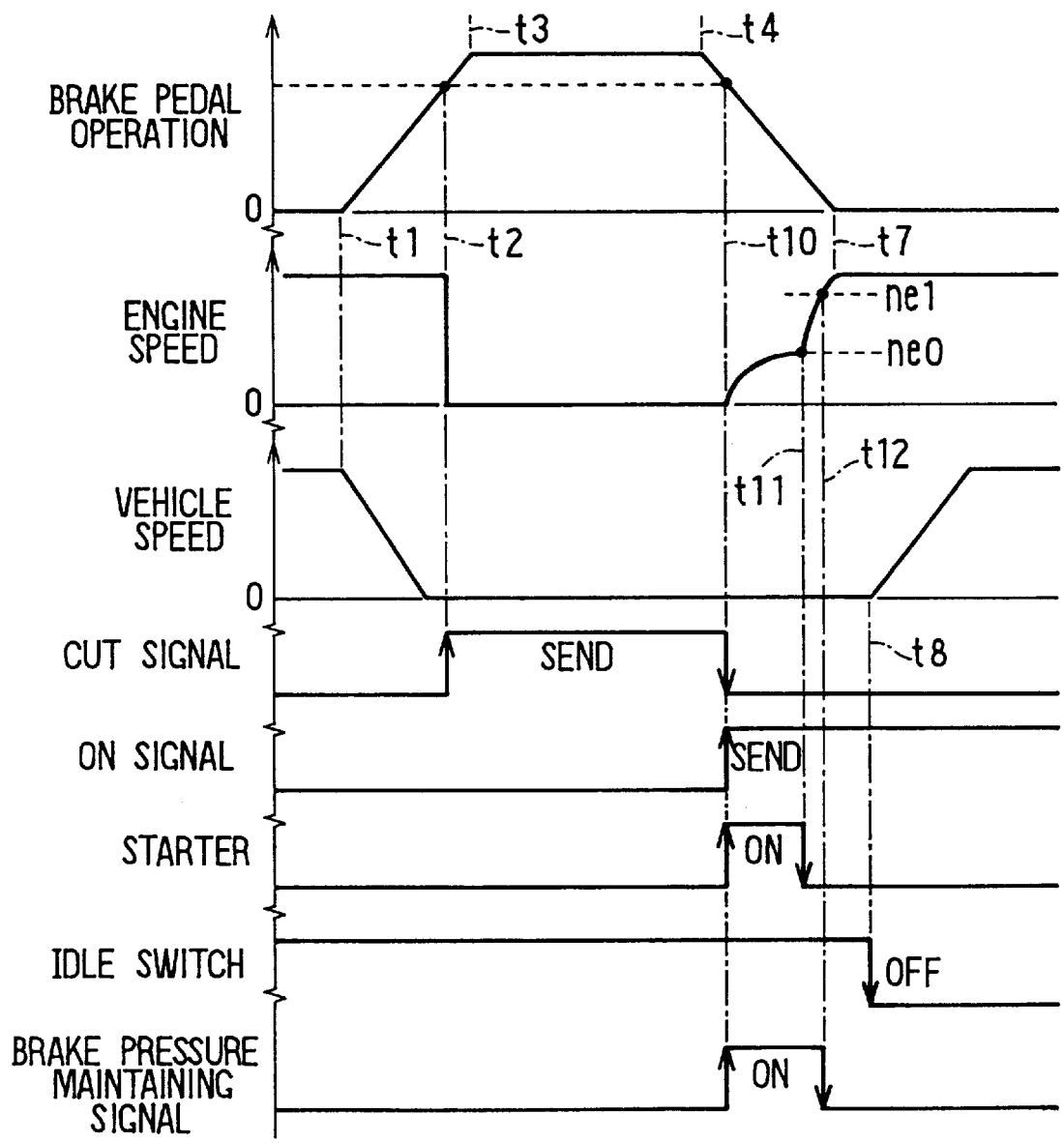
FIG. 12 is a timing diagram for describing a mode of operation of the second embodiment.

After an engine starting condition is fulfilled at steps 301–303 of FIG. 11, at step 304 the ECU 10 drives the solenoid 32 to maintain the braked state (time t10 in FIG. 12). That is to say, the brake pedal 20 is in a depressed state that prevents rolling of the vehicle, and so the stopped state of the vehicle can be maintained via the brake pressure.

Accordingly, at step 305 the ECU 10 begins engine fuel injection and ignition, and at step 306 the ECU 10 actuates the starter 17 and starts the engine. At step 307, when the engine speed ne exceeds the combustion speed ne0 (for example 300 rpm; time t11 in FIG. 12), the ECU 10 determines that complete combustion has occurred in the engine, and at step 308 the ECU 10 halts actuation of the starter 17. Accordingly, at step 309, when the engine speed ne exceeds speed ne1 (for example 400 rpm) sufficient to drive the vehicle (time t12 in FIG. 12), the ECU 10 transfers execution to step 310 and releases the brake pressure held at step 304.

When the output of the starter 17 is large and the crank speed during engine starting is high, that is to say, when ne1 is believed to be less than ne0, the sequence of determination of the "off" state of the engine starter 17 (steps 307 and 308 in FIG. 11) and determination of release of held brake pressure (steps 309 and 310 in FIG. 11) is reversed.

With the above-described structure, vehicle startoff on a grade with no slip-back becomes possible irrespective of driver operation.

That is to say, when the driver misjudges the amount of slope when starting off on a grade and the braking force applied by the driver is weak with respect to the amount of slope during engine starting, vehicle slip-back is possible. However, vehicle slip-back can reliably be prevented by providing the solenoid 32 to control vehicle braking irrespectively of driver operation, holding the braking force and automatically restarting the engine when braking force due to driver operation in an engine-stopped state is a predetermined value or less, and releasing the vehicle braking after generation of sufficient drive force (creeping force) to cause the vehicle to advance after engine starting.

As described above, the ECU 10 and the solenoid 32 are utilized as the braking force controlling unit. However, a device which itself generates braking force may also be utilized. The solenoid was utilized in the above-described example to ensure vehicle braking force by the driver at the start of brake operation. In this case, the brake pressure is maintained and vehicle braking can be ensured by closing the solenoid 32 disposed in the hydraulic brake circuit. Along with this, brake pressure to brake the vehicle can be released, and braking force can be controlled via a simple structure without adding a new source of motive power by opening the solenoid 32 after restarting the engine.

As a result, in the present embodiment, a braking force controlling unit (the ECU 10 and the solenoid 32) is provided to apply predetermined braking force such that the vehicle does not move while the engine is stopped, and so startoff with no slipping of the vehicle becomes possible irrespectively of driver brake operation.

The solenoid 32 disposed in the hydraulic circuit from the master cylinder 30 to the wheel cylinder 30 is preferred from a practical standpoint, because the predetermined braking force is released when engine speed is greater than or equal to a predetermined value.

Third Embodiment

A third embodiment will be described hereinafter, primarily with respect to differences between it and the second embodiment.

Figure 13:
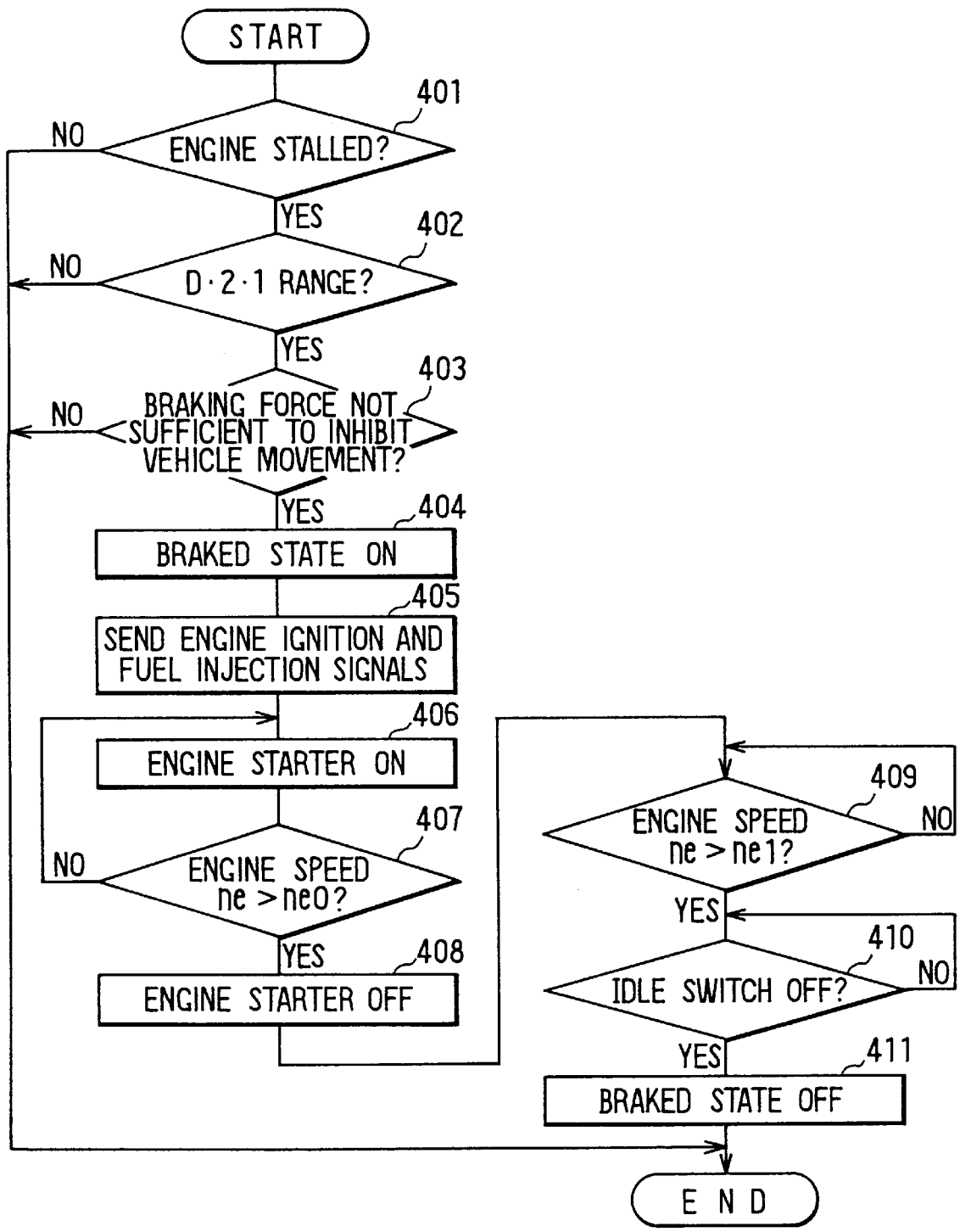
FIG. 13 is a flow diagram for describing a mode of operation of a third embodiment of the present invention.
Figure 14:
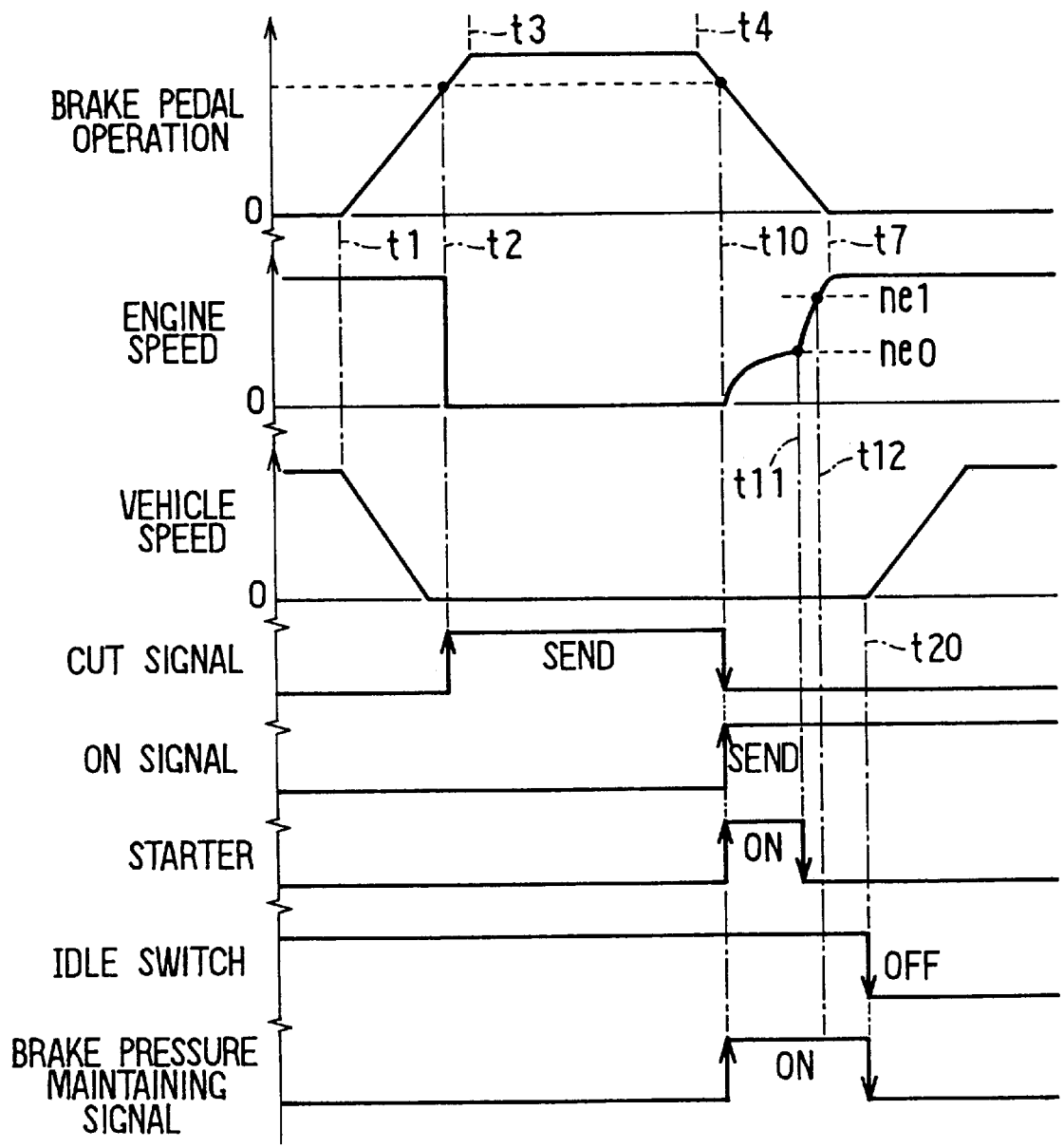
FIG. 14 is a timing diagram for describing a mode of operation of the third embodiment.

After processing stops the engine as in FIG. 4, execution is transferred to processing for starting the engine. FIG. 13 is a flow diagram for engine automatic restarting, and FIG. 14 is an associated timing diagram. This embodiment interposes step 410 of FIG. 13 between steps 309 and 310 of FIG. 11, adding one more condition for brake-pressure release.

To go into greater detail, when an engine starting condition is fulfilled at steps 401–403 (time t10 in FIG. 14), at step 404 the ECU 10 maintains the brake pressure. At step 405 the ECU 10 begins engine fuel injection and ignition, and at step 406 the ECU 10 actuates the starter 17 and starts the engine. At step 407, when the engine speed ne exceeds the combustion speed ne0 (time t11 in FIG. 14), the ECU 10 determines that complete combustion has occurred and at step 408 the ECU 10 halts actuation of the starter 17 and stops the starter 17.

Accordingly, when the engine speed ne exceeds speed ne1 sufficient to drive the vehicle (time t12 in FIG. 14) at step 409 and the ECU 10 detects depression of the accelerator pedal at step 410 (time t20 in FIG. 14), the ECU 10 transfers execution to step 411 and releases the brake pressure held at step 404.

Consequently, during the period from stopping to starting the engine, not only is there no vehicle slip-back, but the vehicle also does not begin to move with just the release of the brake, irrespectively of operation by the driver.

With the above-described structure, during vehicle startoff on a grade, not only does vehicle startoff with no slip-back become possible irrespectively of operation by the driver, but also braking is not released unless starting of the engine and depression of the accelerator are detected. Therefore, not only does the vehicle not begin to move with starting of the engine, but the intent of the driver to start off can be accurately reflected, thereby enhancing safety.

As a result, in the present embodiment, braking is released when a rise in engine speed and accelerator depression are detected. Therefore, the vehicle does not begin to move even when the brake is released and the engine is started, and the intent of the driver to start off as indicated by depressing the accelerator can be accurately reflected.

Fourth Embodiment

A fourth embodiment will be described hereinafter, chiefly with respect to differences between it and the third embodiment.

Figure 15:
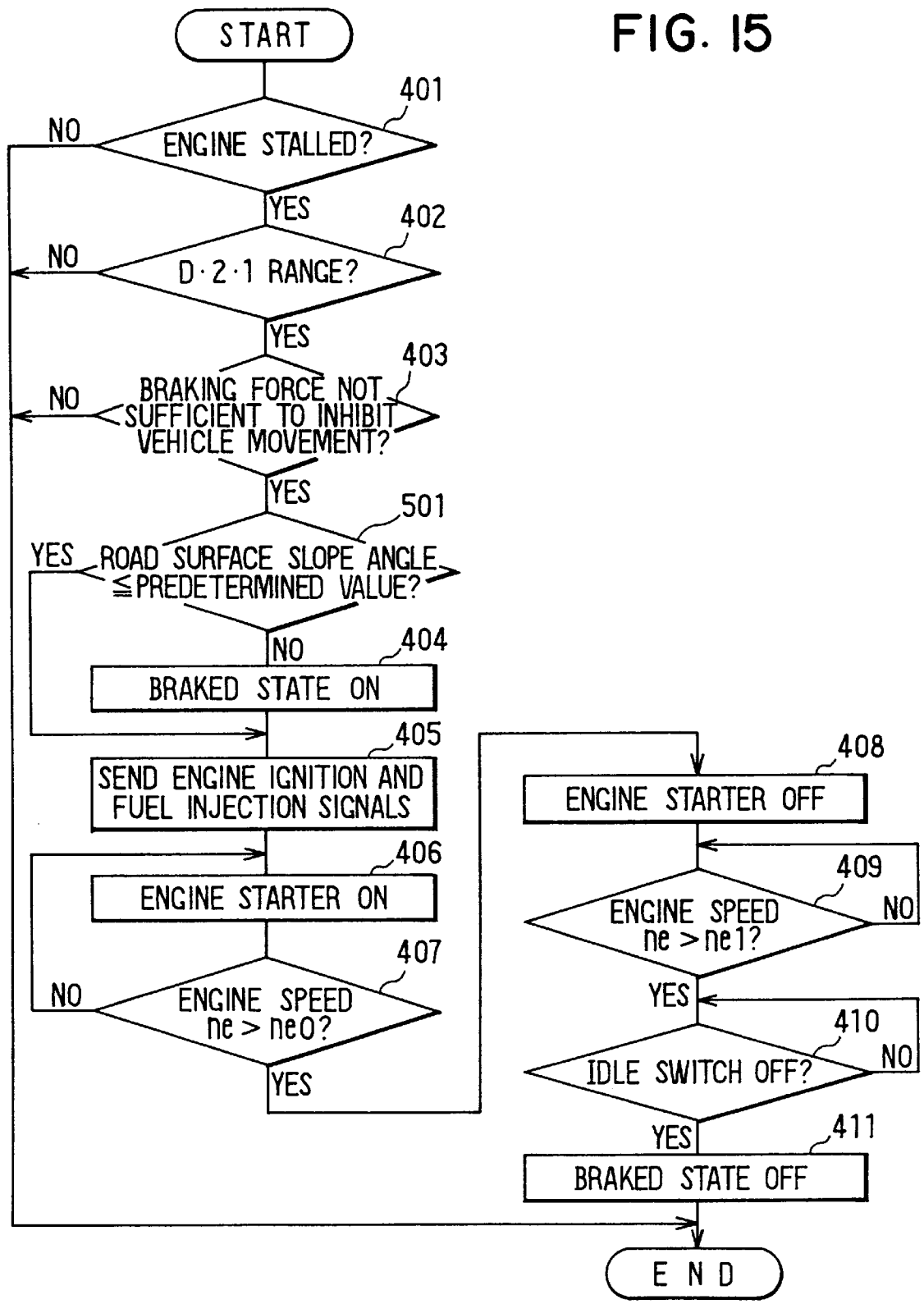
FIG. 15 is a flow diagram for describing a mode of operation of a fourth embodiment of the present invention.

After stopping of the engine by processing for automatic engine stopping similar to FIG. 4, execution is transferred to processing for starting the engine. FIG. 15 is a flow diagram for engine automatic restarting. With this embodiment, when the slope angle of the road surface is less than or equal to a predetermined value at step 501 of FIG. 15, the processing at step 404 to hold the brake pressure is bypassed, and the processing to hold the brake pressure is executed solely when the slope angle of the road surface is greater than or equal to a predetermined value.

That is to say, whereas with the second and third embodiments the braking force of the vehicle is maintained during automatic engine stoppage with no distinction between whether the stopped state of the vehicle is on a level road surface or on a grade, with the present embodiment the slope state of the road surface is detected, and braking of the vehicle is controlled solely when the slope angle of the road surface is greater than or equal to a predetermined value, thus avoiding consumption of electrical power to actuate the coil of the solenoid 32 when the vehicle is stopped on a level road. That is, application of braking force is prohibited, and electrical power consumption is suppressed, when the slope angle of the road surface is greater than or equal to a predetermined value.

Fifth Embodiment

Figure 16:
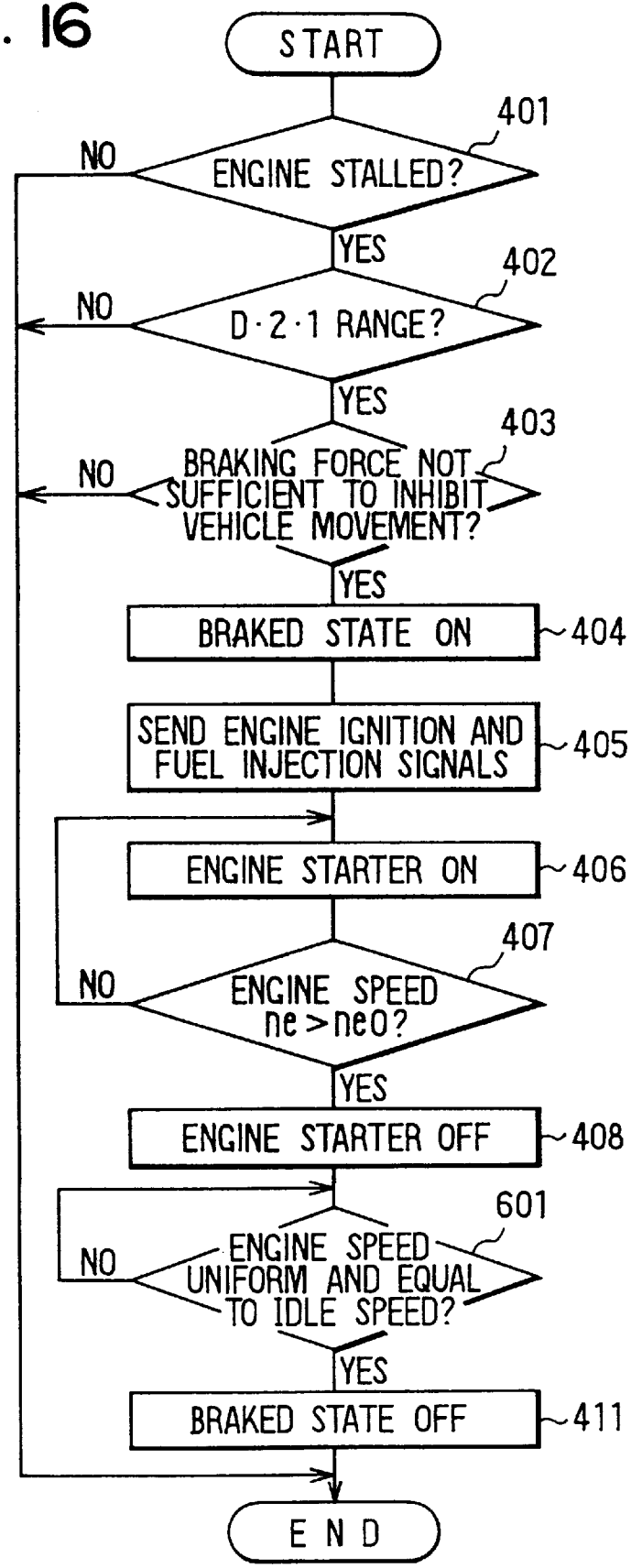
FIG. 16 is a flow diagram for describing a mode of operation of a fifth embodiment of the present invention.
Figure 17:
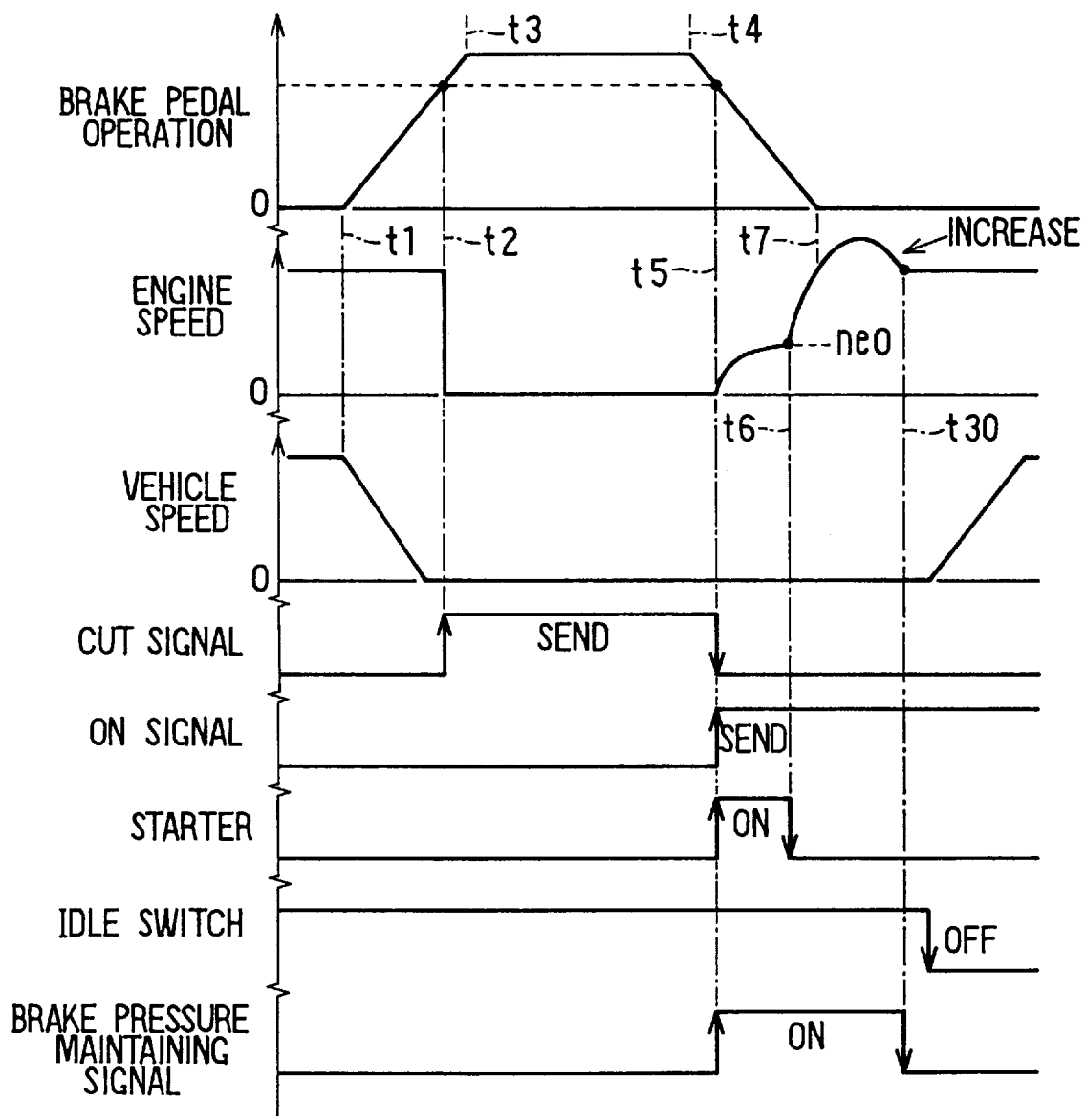
FIG. 17 is a timing diagram for describing a mode of operation of the fifth embodiment.

A fifth embodiment will be described hereinafter, primarily with respect to differences between it and the third embodiment. After the vehicle is stopped in a manner similar to that shown in FIG. 4, execution is transferred to processing for starting the engine. FIG. 16 is a flow diagram for engine automatic restarting, and FIG. 17 is an associated timing diagram.

When an engine starting condition is fulfilled at steps 401–403 of FIG. 16, at step 403 the ECU 10 holds the brake pressure and at steps 405–408 the ECU 10 initiates engine cranking. Thereafter, at step 601, when the engine speed is uniform at a predetermined timing and engine speed is equal to idle speed (time t30 in FIG. 17), at step 411 the ECU 10 releases a predetermined braking force.

That is to say, the brake is released when idle speed is reached after initial spiked engine speed during engine starting, and so lurching due to the initially spiked engine speed immediately after starting can be prevented.

Sixth Embodiment

A sixth embodiment will be described hereinafter, primarily with respect to differences between it and the second embodiment.

Figure 18:
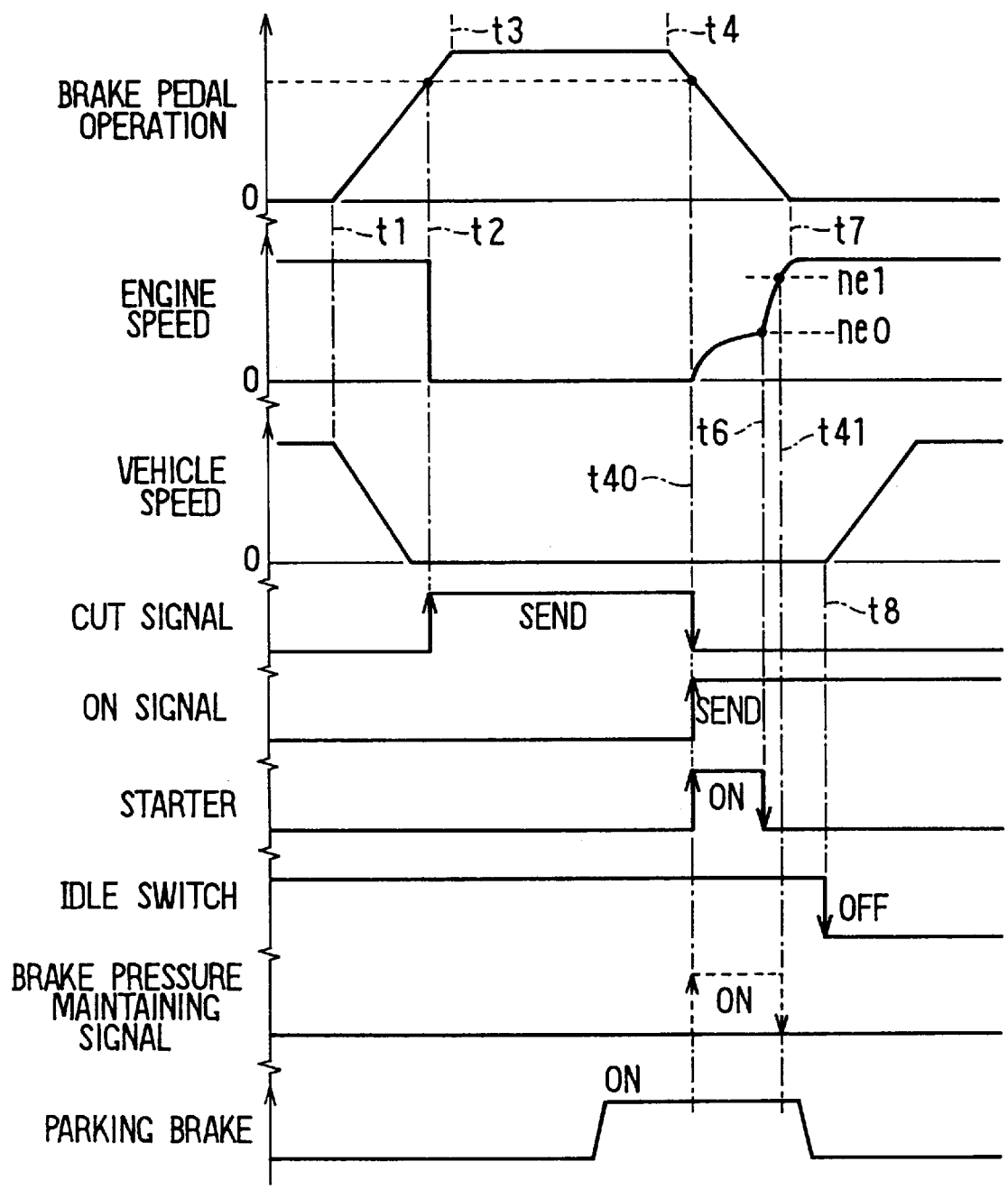
FIG. 18 is a timing diagram for describing a mode of operation of a sixth embodiment of the present invention.

FIG. 18 is a timing diagram for this embodiment, which is structured with the operated state of a parking brake also being taken into account.

To go into more detail, when the driver operates the parking brake and releases the foot brake (brake pedal) to maintain the vehicle in a stopped state while the engine is stopped, the time for which the brake is held until vehicle startoff becomes lengthy, and coil heating becomes a concern.

As a result, this embodiment employs a structure which will be described hereinafter.

As shown in FIG. 1, a parking-brake operated-quantity sensor 40 is connected to the ECU 10. This parking-brake operated-quantity sensor 40 detects the operated quantity of the parking brake. Accordingly, the operated state of the parking brake is monitored when an engine-restarting condition is fulfilled at time t40 in the timing diagram of FIG. 18, and when the parking brake is in an operated state, holding of braking force is not performed.

Figure 19:
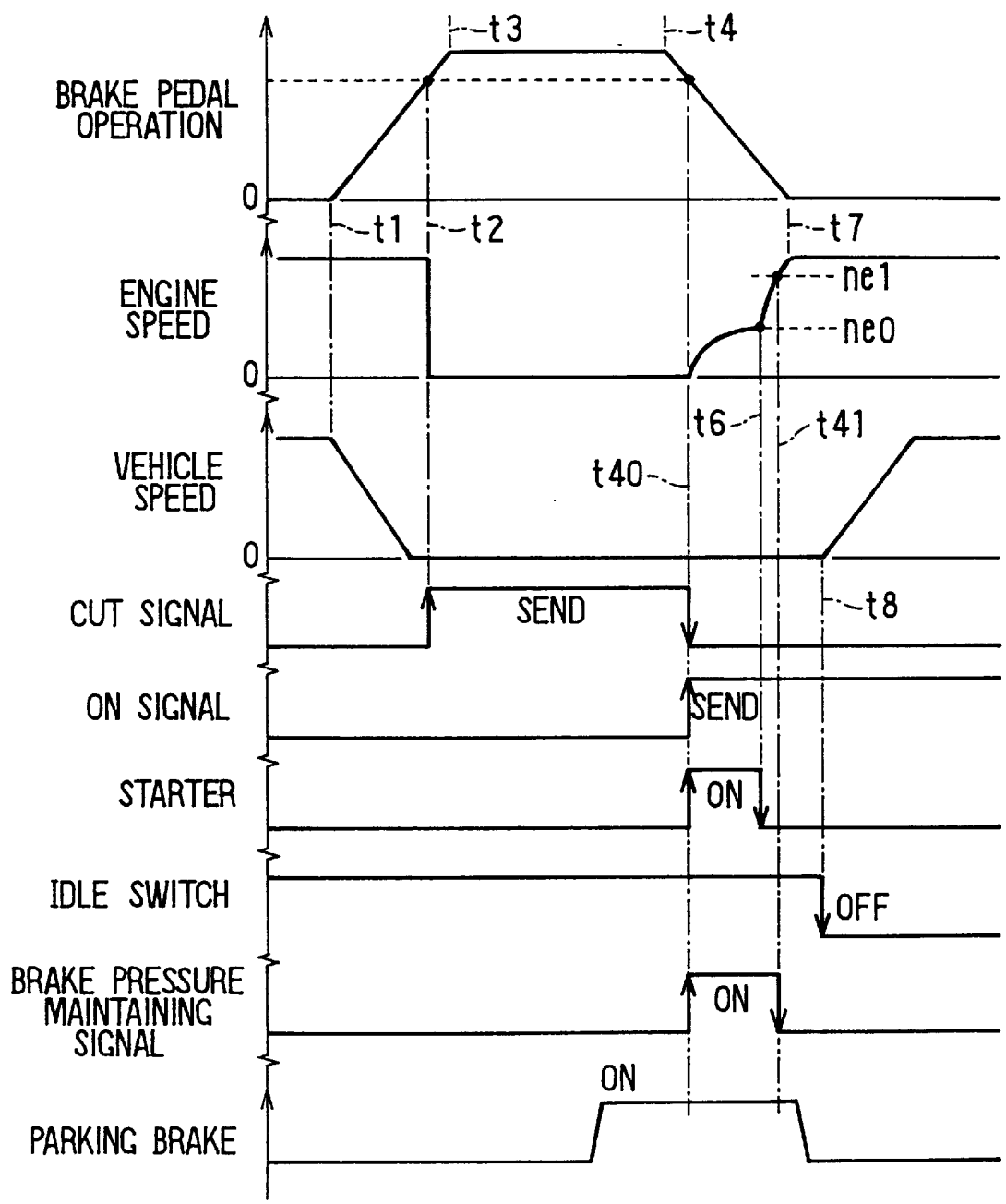
FIG. 19 is a timing diagram for purpose of comparison.

That is to say, when the parking brake is operated and the brake pedal 20 is released to maintain the vehicle in a stopped state while the engine is stopped as shown in FIG. 12, holding of the braking force is performed immediately when braking force due to the brake pedal 20 drops below a predetermined value at time t40 while the pressure on the brake pedal 20 is being relaxed, as shown in FIG. 19. In contrast thereto, with the embodiment depicted in FIG. 18, when the parking brake is pulled at the same time t40, heat generation accompanying prolonged actuation of the coil of the solenoid 32 can be prevented without outputting a braking force holding signal.

Therefore, when the braking force of another unit (i.e., the parking brake) becomes greater than or equal to a predetermined value when braking force due to the brake pedal 20 becomes less than or equal to a predetermined value, application of braking force is prohibited, and so heat generation by the coil of the solenoid 32 can be suppressed.

Seventh Embodiment

A seventh embodiment will be described hereinafter, primarily with respect to differences between it and the sixth embodiment.

Figure 20:
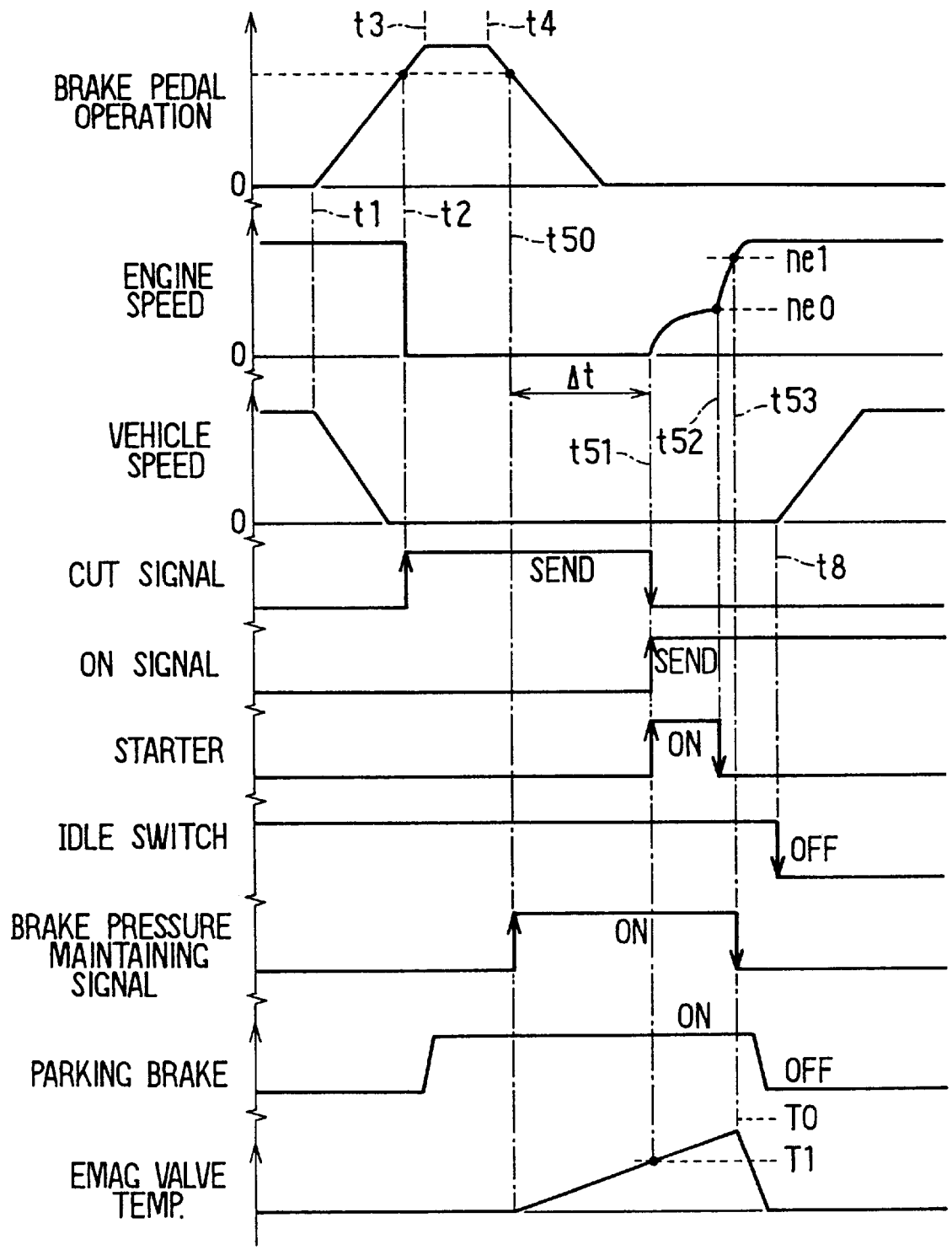
FIG. 20 is a timing diagram for describing a mode of operation of a seventh embodiment of the present invention.
Figure 21:
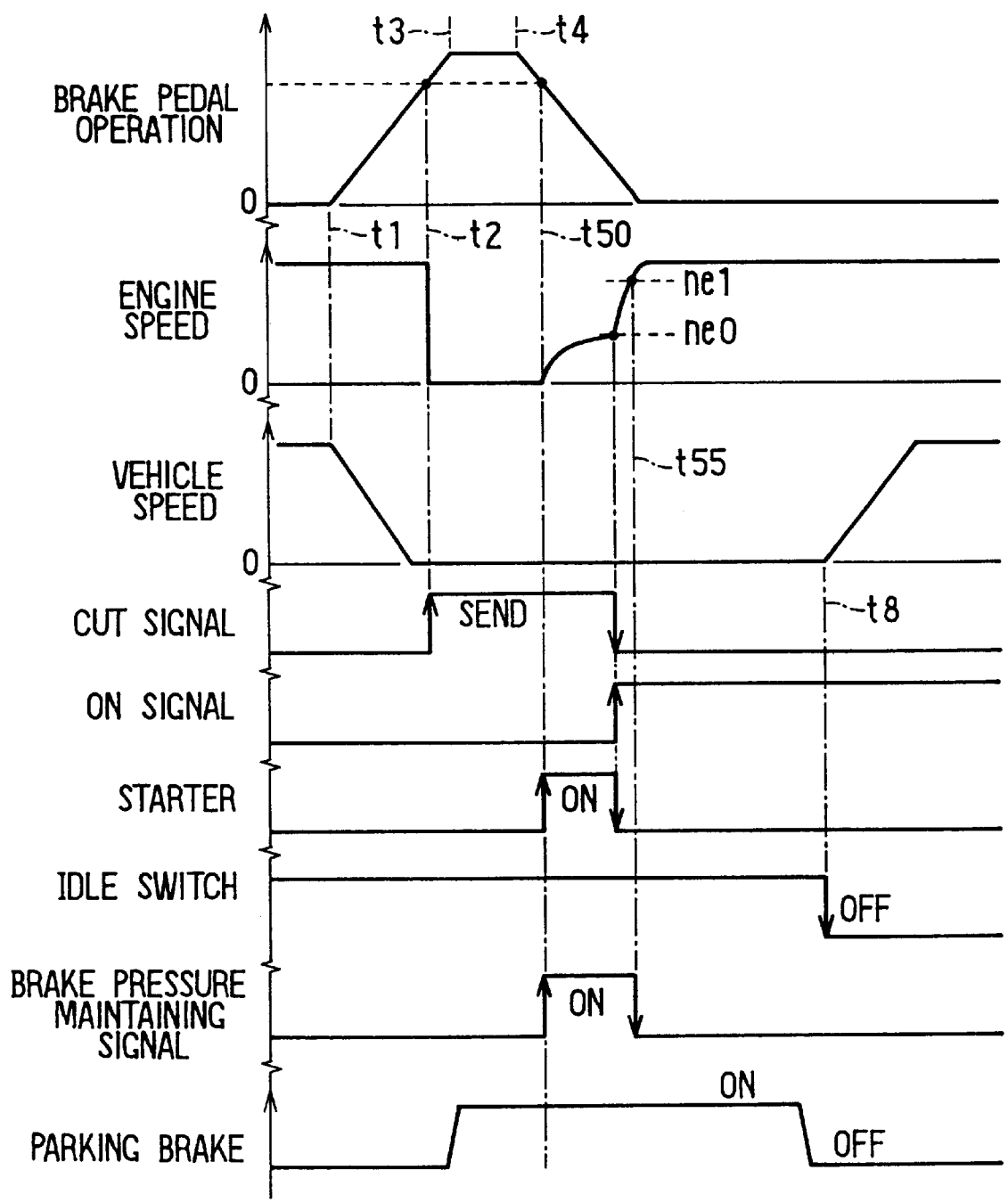
FIG. 21 is a timing diagram for purpose of comparison.

FIG. 20 is a timing diagram for this embodiment. This embodiment modifies the sixth embodiment so as to avoid shortening of the time the engine is stopped.

To go into greater detail, with the sixth embodiment, as shown in FIG. 12, the engine is restarted when the braking force due to the brake pedal 20 falls below a predetermined value at time t50 while the pressure on the brake pedal 20 is being relaxed. In contrast thereto, a structure which will be described hereinafter is employed to avoid shortening of the time the engine is stopped.

A coil-temperature sensor 50 (refer to FIG. 1) is utilized to monitor the temperature of the coil 32a of the solenoid 32. Accordingly, when the parking brake has not been pulled at the time t50 in FIG. 20 while the pressure on the brake pedal 20 is being relaxed, the solenoid 32 is driven. Thereafter, when the coil temperature reaches a predetermined temperature T1 due to actuation of the coil 32a (time t51 in FIG. 19), starting of the engine begins. Accordingly, after the starter is switched off at time t52, when engine speed has reached the speed ne1 sufficient to drive the vehicle at t53, the solenoid 32 is switched off and the braking force is released. As a result, the stopped state of the engine is continued for the interval from t50 to t51 in FIG. 20 (i.e., the time indicated by Δt), and the coil temperature of the solenoid 32 also does not rise above an upper-limit value T0 of usage temperature. Stated another way, a comparative value T1 is set so as not to rise above the upper-limit value T0 of usage temperature.

Therefore, in this embodiment, when the coil temperature of the solenoid 32 reaches a predetermined temperature, the ECU 10 restarts the engine, and so engine-stopped time can be lengthened while taking heat generation of the coil into account.

Figure 22:
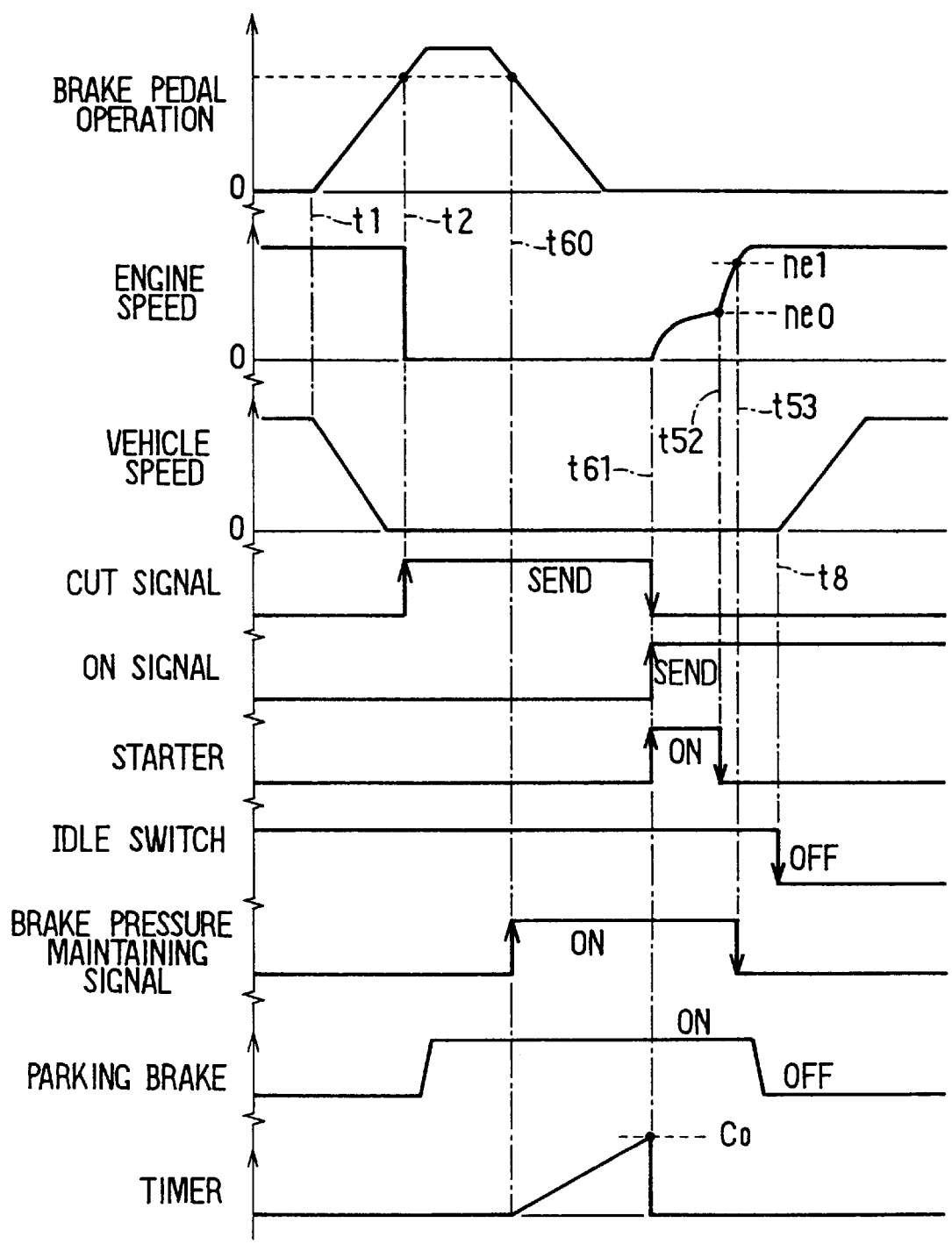
FIG. 22 is a timing diagram for describing a mode of operation of another example of the seventh embodiment.

As a sample application of this embodiment, instead of monitoring the temperature of the coil of the solenoid 32, it is also acceptable to initiate a timer-count operation at the start of operation of the solenoid 32, and when an operation time C0 extending from t60 to t61 is reached, begin starting of the engine, as shown in FIG. 22. When restarting of the engine is triggered after a predetermined time has elapsed after initiating operation of the solenoid 32 in this way, the temperature sensor 50 is not required. Therefore, system cost can be reduced.

Eighth Embodiment

An eighth embodiment will be described hereinafter, primarily with respect to differences between it and the second embodiment.

Figure 23:
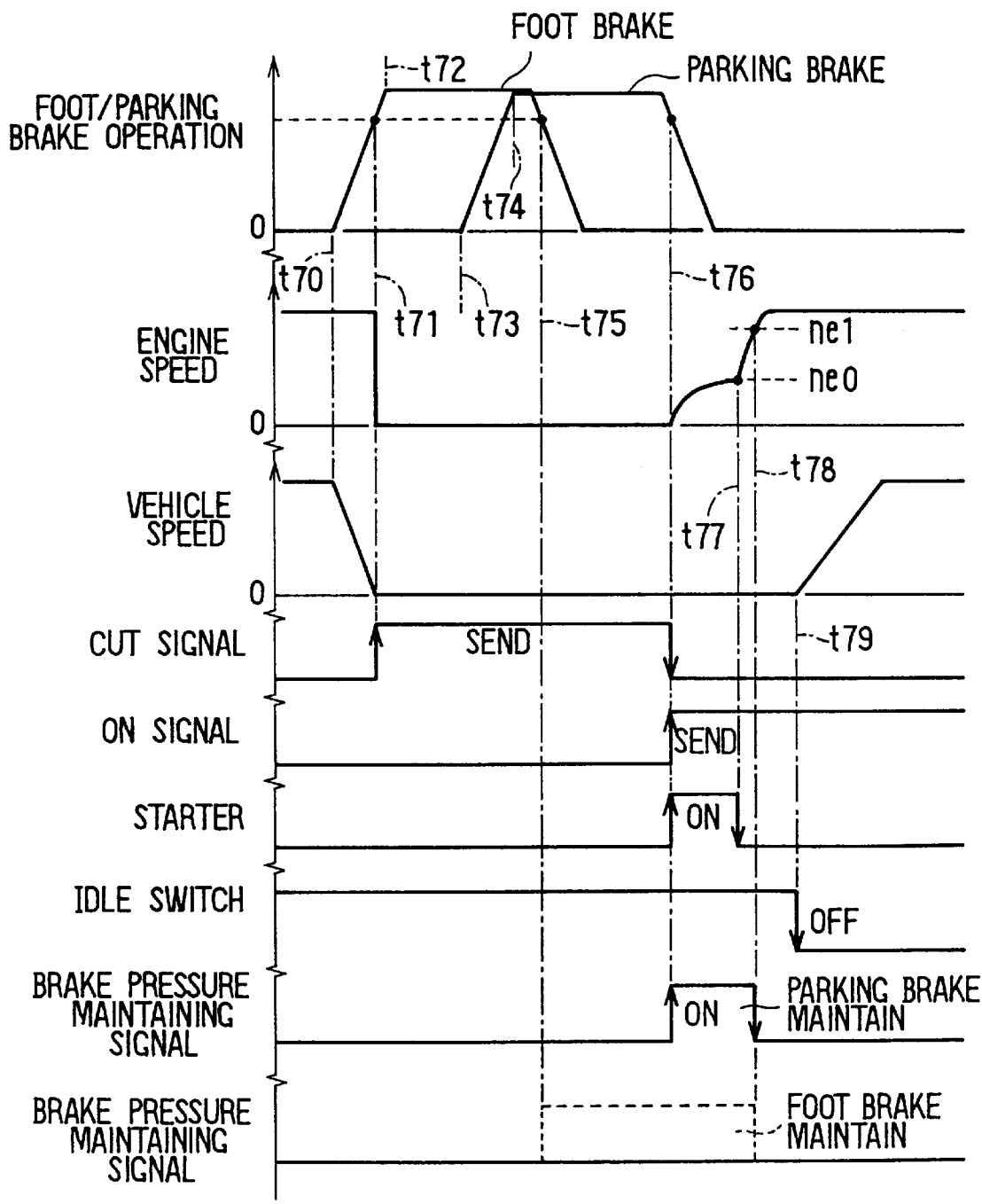
FIG. 23 is a timing diagram for describing a mode of operation of an eighth embodiment of the present invention.

FIG. 23 is a timing diagram for this embodiment. This embodiment also is structured also to take the operated state of the parking brake into account. This embodiment provides a mechanism to maintain the braking force of both the foot brake and the parking brake. Namely, a braking force holding device for parking-brake use 60 is provided in addition to the solenoid for foot-brake use 32, as shown in FIG. 1. A system which chucks the wire of the parking brake or the like can be utilized as the braking force holding device for parking-brake use 60.

Accordingly, operation of the foot brake is begun at time t70 in FIG. 23, maximum depression amount is reached at t72, operation of the parking brake is begun at t73, a maximum amount is reached at t74, and thereafter the foot brake is released, and the parking brake is released at startoff.

In this case, an operation to hold the braking force is executed when the sum of braking force due to the foot brake and braking force due to the parking brake is equal to or less than a predetermined value. That is to say, in a case where the vehicle is stopped utilizing the foot brake for stopping the vehicle and thereafter the parking brake is pulled, as shown in FIG. 23, brake holding begins at time t76 whereat the parking brake is relaxed to a certain extent.

In this way, after the starting condition for the engine is fulfilled and holding of brake pressure and engine starting have begun, when the engine speed ne exceeds the combustion speed ne0 (time t77 in FIG. 23), the starter 17 is stopped. When the engine speed ne has reached the speed ne1 sufficient to drive the vehicle (time t78 in FIG. 23), the held brake pressure is released.

Accordingly, as is illustrated at the very bottom of FIG. 23, braking force due to the foot brake falls below a predetermined value at time t75. In a case where this is taken to be the trigger for holding braking force, the holding operation is performed for a prolonged period. However, this phenomenon can be avoided with the present embodiment.

As a result, in this embodiment, the ECU 10 starts to apply braking force when the sum of the respective braking forces of the plurality of braking force operating members (i.e., the foot brake and the parking brake) is less than or equal to a predetermined value, and so wasteful braking force holding operation can be avoided. This embodiment is preferred particularly from the standpoint of suppressing heat generation by the coil of the solenoid 32.

Cases of application in a vehicle provided with an automatic transmission were described hereinabove, but application in a vehicle provided with a manual transmission is also contemplated.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A motor vehicle engine control apparatus, comprising:
a control device for controlling an engine to restart the engine after engine stoppage accompanying operation of a braking force operating member in an interval after alleviation of braking force by said braking force operating member until said braking force operating member is released.

2. The motor vehicle engine control apparatus of claim 1, wherein said control device restarts said engine when said braking force becomes smaller than a predetermined value.

3. The motor vehicle engine control apparatus of claim 1, further comprising a hydraulic pressure sensor for detecting hydraulic brake pressure in a vehicle hydraulic brake circuit, said control device restarting said engine in response to received signals from said hydraulic pressure sensor.

4. The motor vehicle engine control apparatus of claim 1, further comprising a braking force operating member sensor for detecting operation of said braking force operating member, said control device restarting said engine in response to received signals from said braking force operating member sensor.

5. The motor vehicle engine control apparatus of claim 4, wherein said braking force operating member is a switch to output a switching signal at a predetermined operating position.

6. The motor vehicle engine control apparatus of claim 4, wherein release of said braking force operating member is detected via detection of an operating direction of said braking force operating member by an operating direction sensor.

7. The motor vehicle engine control apparatus of claim 1, wherein said control device stops said engine when braking force becomes larger than a first predetermined value, and restarts said engine when braking force becomes smaller than a second predetermined value.

8. The motor vehicle engine control apparatus of claim 7, wherein said first predetermined value equals said second predetermined value.

9. The motor vehicle engine control apparatus of claim 1, wherein said engine control device stops said engine when a braking force sufficient to keep said vehicle stationary is applied, and restarts said engine when said braking force becomes less than sufficient to keep said vehicle stationary.

10. The motor vehicle engine control apparatus of claim 9, further comprising a slope sensor for determining road surface slope, wherein said engine control device causes a sufficient braking force to be generated such that said vehicle does not move in accordance with said road surface slope according to said slope sensor.

11. The motor vehicle engine control apparatus of claim 1, further comprising a braking force control device for applying a predetermined braking force such that said vehicle does not move at least while said engine is stopped.

12. The motor vehicle engine control apparatus of claim 11, wherein said braking force control device causes release of said predetermined braking force when speed of said engine is greater than or equal to a predetermined value.

13. The motor vehicle engine control apparatus of claim 11, wherein said braking force control device causes release of said predetermined braking force when speed of said engine is greater than or equal to a predetermined value and an accelerator pedal is depressed.

14. The motor vehicle engine control apparatus of claim 11, wherein said braking force control device prohibits application of braking force when a road surface slope according to a slope sensor is less than or equal to a predetermined value.

15. The motor vehicle engine control apparatus of claim 11, wherein said braking force control device causes release of said predetermined braking force when engine speed reaches a fixed speed range after engine starting.

16. The motor vehicle engine control apparatus of claim 11, wherein said braking force control device prohibits application of braking force when a braking force of another braking force operating member is greater than or equal to a predetermined value.

17. The motor vehicle engine control apparatus of claim 11, wherein:
each of a plurality of braking force operating members is provided with means for maintaining braking force thereof; and
said braking force control device applies braking force when a sum of respective braking forces of said plurality of braking force operating members is less than or equal to a predetermined value.

18. The motor vehicle engine control apparatus of claim 11, further comprising a brake system hydraulic circuit for braking said vehicle in response to said braking force being applied to said braking force operating member, said brake system hydraulic circuit including at least a master cylinder, a wheel cylinder and a solenoid disposed between said master cylinder and said wheel cylinder for controlling communication therebetween, wherein said braking force control device applies a predetermined braking force to maintain said vehicle in a stationary position by controlling said solenoid.

19. The motor vehicle engine control apparatus of claim 12, wherein said braking force control device restarts said engine when one of a coil temperature of said solenoid reaches one of a predetermined temperature and time since actuation of said solenoid reaches a predetermined value.

* * * * *